(12) United States Patent
Lim et al.

(10) Patent No.: US 9,366,912 B2
(45) Date of Patent: Jun. 14, 2016

(54) LIQUID CRYSTAL DISPLAY DEVICE

(71) Applicant: Samsung Display Co., Ltd., Yongin, Gyeonggi-Do (KR)

(72) Inventors: Tae Woo Lim, Hwaseong-si (KR); Yu Deok Seo, Hwaseong-si (KR); Sunghwan Won, Suwon-si (KR); Kyungtae Chae, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 122 days.

(21) Appl. No.: 14/036,092

(22) Filed: Sep. 25, 2013

(65) Prior Publication Data

US 2014/0268000 A1   Sep. 18, 2014

(30) Foreign Application Priority Data

Mar. 12, 2013   (KR) .......................... 10-2013-0026336

(51) Int. Cl.
    *G02F 1/1339*   (2006.01)
(52) U.S. Cl.
    CPC ................................... *G02F 1/1339* (2013.01)

(58) Field of Classification Search
    CPC ............ G02F 1/1339; G02F 1/133377; G02F 1/13394; G02F 1/1334; C09K 19/544
    See application file for complete search history.

(56) References Cited

U.S. PATENT DOCUMENTS

| | | | |
|---|---|---|---|
| 2005/0078252 A1* | 4/2005 | Lin ................................ | 349/139 |
| 2006/0109412 A1* | 5/2006 | Hsiao et al. .................... | 349/146 |
| 2006/0203173 A1* | 9/2006 | Kim ................... G02F 1/133707 349/146 |
| 2012/0062448 A1* | 3/2012 | Kim et al. ......................... | 345/55 |
| 2013/0093985 A1* | 4/2013 | Kang et al. .................... | 349/106 |
| 2013/0308071 A1* | 11/2013 | Kim et al. ....................... | 349/43 |
| 2014/0055440 A1* | 2/2014 | Cho et al. ....................... | 345/212 |
| 2014/0203301 A1* | 7/2014 | Kim et al. ....................... | 257/88 |

* cited by examiner

*Primary Examiner* — Ryan Crockett
(74) *Attorney, Agent, or Firm* — Cantor Colburn LLP

(57) ABSTRACT

A liquid crystal display device includes a substrate, a cover layer which defines a tunnel-shaped cavity on the substrate, a support part which extends from the cover layer and corresponds to an edge of the tunnel-shaped cavity, a liquid crystal layer in the tunnel-shaped cavity, first and second electrode which apply an electric field to the liquid crystal layer, and a sealant layer which seals the tunnel-shaped cavity.

20 Claims, 38 Drawing Sheets

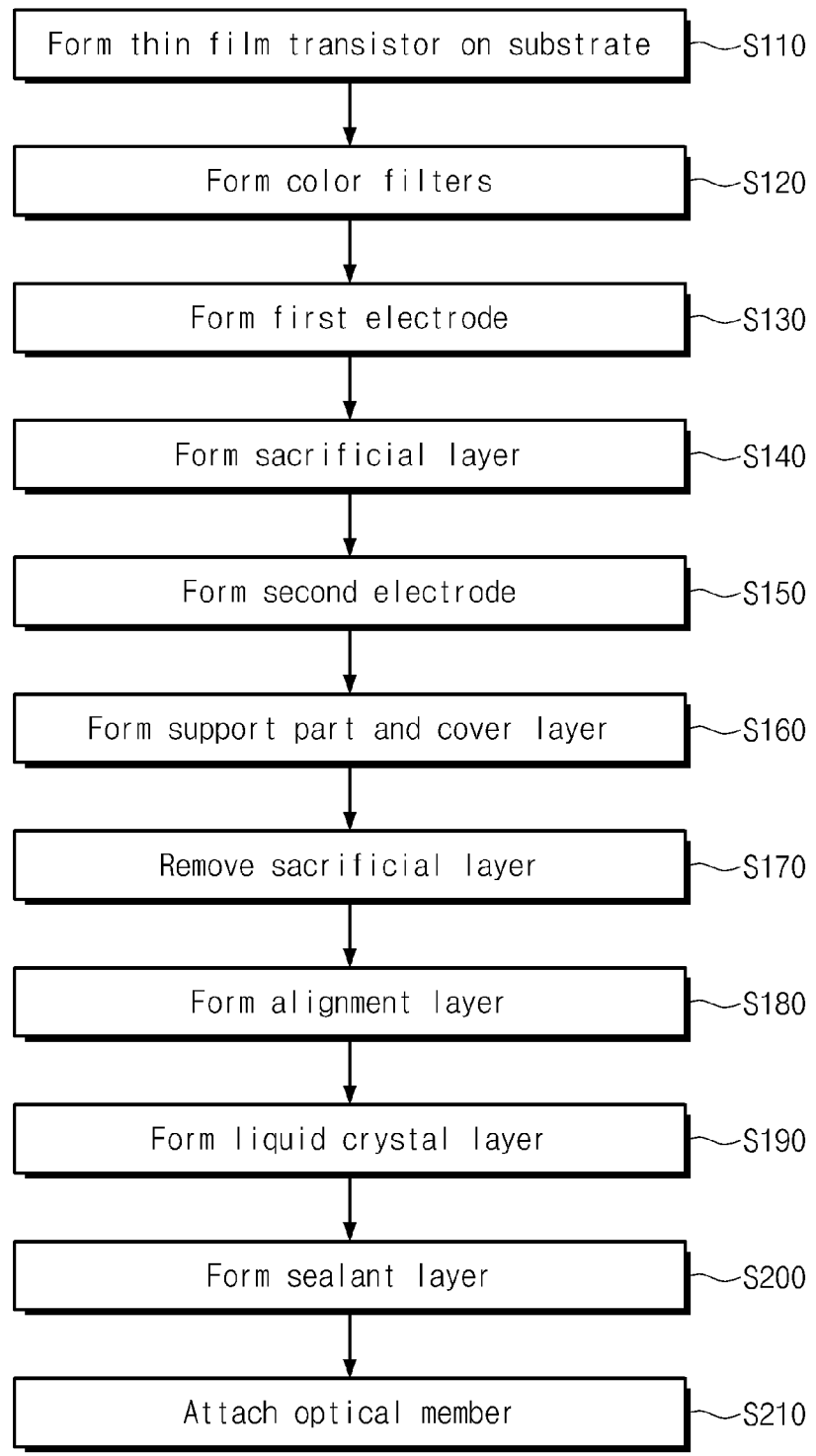

LIQUID CRYSTAL DISPLAY DEVICE

This application claims priority to Korean Patent Application No. 10-2013-0026336, filed on Mar. 12, 2013, and all the benefits accruing therefrom under 35 U.S.C. §119, the contents of which are hereby incorporated by reference in its entirety.

BACKGROUND

1. Field

The invention relates to a liquid crystal display device.

2. Description of the Related Art

Various display devices, such as a liquid crystal display device, an electrophoretic display device, etc., are widely used instead of a cathode ray tube display device.

The display device includes two substrates facing each other and an image display unit interposed between the two substrates, e.g., a liquid crystal layer, an electrophoretic layer, etc. The two substrates are coupled to each other while facing each other and are spaced apart from each other by a distance to allow the image display unit to be disposed therebetween.

To manufacture the display device, a spacer is formed on one of the two substrates to maintain the distance between the two substrates, and the other one of the two substrates is attached to the spacer using an adhesive.

As a result of using two substrates, a manufacturing process of the display device is complicated and a manufacturing cost of the display device is increased. Therefore, there remains a need for an improved method of manufacturing a display device, having a simpler manufacturing process and decreased manufacturing costs.

SUMMARY

One or more exemplary embodiment of the invention provides a liquid crystal display device capable of simplifying a manufacturing method thereof and improving an image display quality thereof.

An exemplary embodiments of the invention provides a liquid crystal display device including a substrate, a cover layer which defines a tunnel-shaped cavity on the substrate, a support part extended from the cover layer and corresponding to an edge of the tunnel-shaped cavity, a liquid crystal layer in the tunnel-shaped cavity, first and second electrodes which apply an electric field to the liquid crystal layer, and a sealant layer which seals the tunnel-shaped cavity.

The tunnel-shaped cavity may include entrance portions at opposing ends thereof and the support part corresponds to the entrance portions. The support part may include a plurality of portions each corresponding to the edge of the tunnel-shaped cavity, and may overlap the tunnel-shaped cavity when viewed in a plan view. The support part may include a same material as the cover layer, and the cover layer and the support part may form a single, unitary, indivisible member.

The cover layer may include a cover portion separated from the substrate and substantially parallel to an upper surface of the substrate, and a sidewall portion which connects the upper surface of the substrate and the cover portion to each other. The support part may be extended from the sidewall portion.

The tunnel-shaped cavity may have a rectangular shape when viewed in a plan view, and a center line extended along a lengthwise (e.g., longitudinal) direction of the tunnel-shaped cavity and passing through a center portion of a width direction vertical to the longitudinal direction of the tunnel-shaped cavity may include a bent portion. That is, the center line may not be a straight line, e.g., the center line may be a curved line. The center line may include two straight lines inclined with respect to each other.

According to one or more exemplary embodiment of the display device according to the invention, a process of coupling two substrates in manufacturing a display device is omitted. In addition, in one or more exemplary embodiment of a display device and manufacturing method thereof, the amount of substrates and the liquid crystal molecules is reduced compared to that of a conventional display device. Thus, a manufacturing time and a manufacturing cost of the display device are extremely reduced.

Further, in one or more exemplary embodiment of a display device and manufacturing method thereof, deformation of the tunnel-shaped cavity in which the liquid crystal layer is provided may be reduced or effectively prevented, and thus an image display quality of the display device may be improved.

BRIEF DESCRIPTION OF THE DRAWINGS

The above and other advantages of the invention will become readily apparent by reference to the following detailed description when considered in conjunction with the accompanying drawings wherein:

FIG. 3 is a flowchart showing an exemplary embodiment of a method of manufacturing a display device according to the invention;

DETAILED DESCRIPTION

Figure 1:
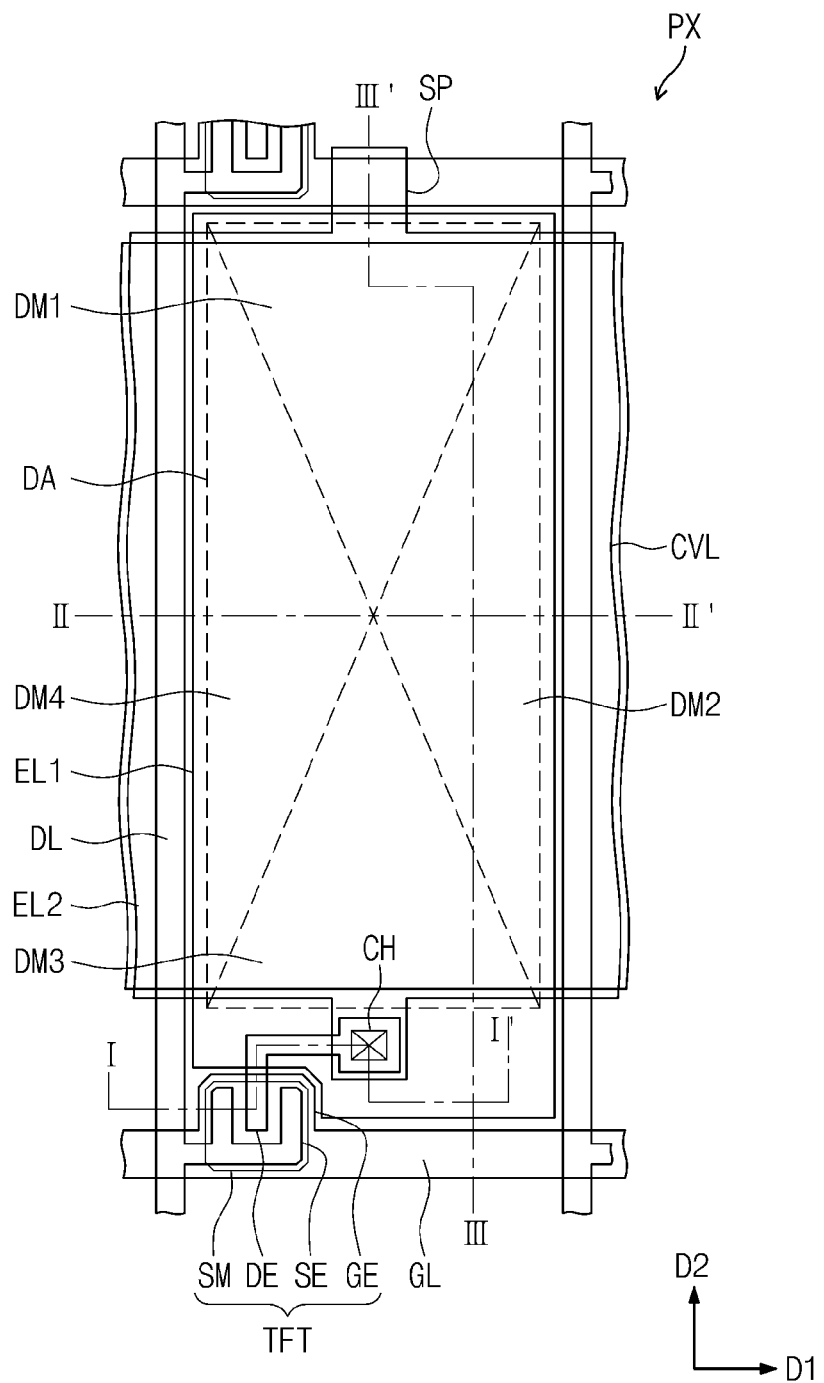
FIG. 1 is a plan view showing a portion of an exemplary embodiment of a display device according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" or "under" relative to other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2A:
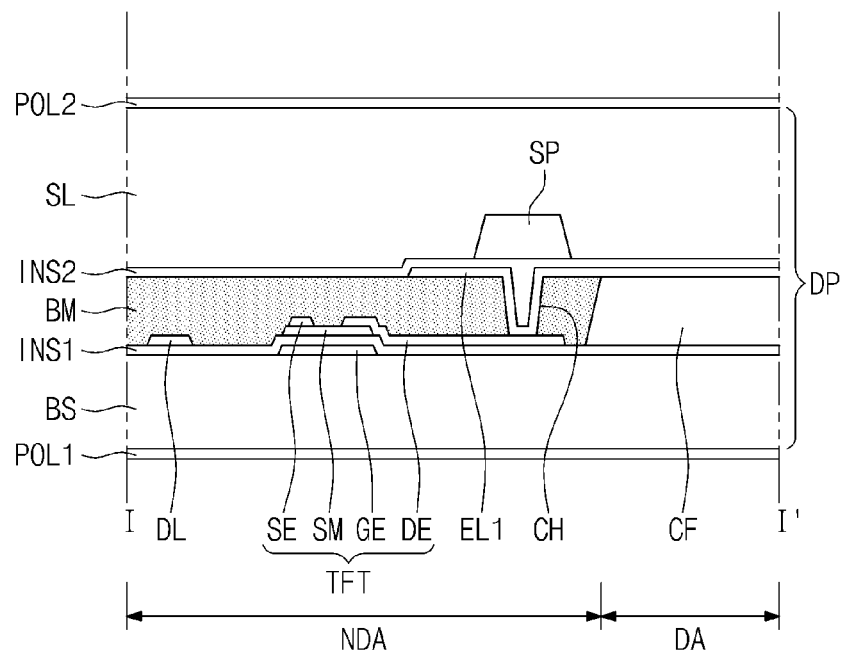
FIG. 2A is a cross-sectional view taken along line I-I' of FIG. 1.
Figure 2B:
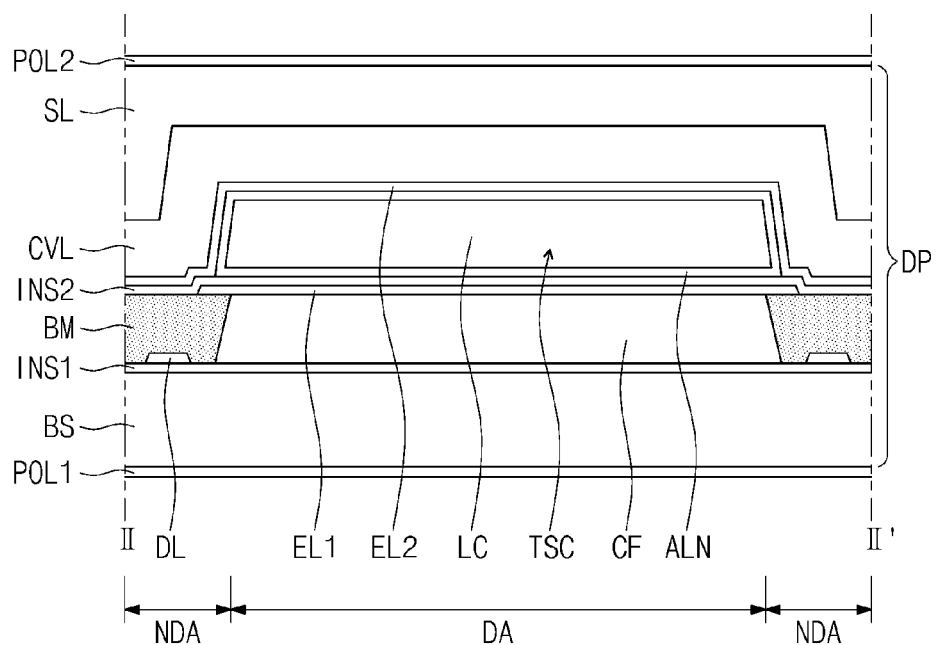
FIG. 2B is a cross-sectional view taken along line II-II' of FIG. 1.
Figure 2C:
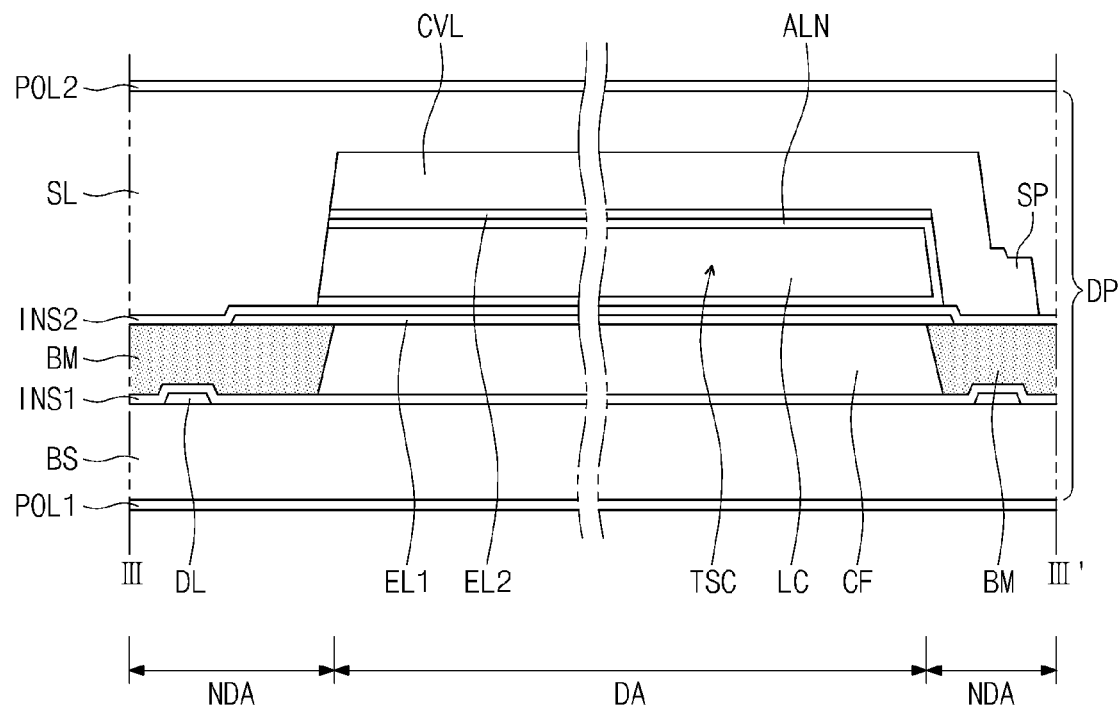
FIG. 2C is a cross-sectional view taken along line III-III' of FIG. 1.

FIG. 1 is a plan view showing a portion of an exemplary embodiment of a display device according to the invention, FIG. 2A is a cross-sectional view taken along line I-I' of FIG. 1, FIG. 2B is a cross-sectional view taken along line II-II' of FIG. 1, and FIG. 2C is a cross-sectional view taken along line III-III' of FIG. 1.

Referring to FIGS. 1, 2A, 2B and 2C, the display device includes a display panel DP, and an optical member provided at both sides of the display panel DP.

The display panel DP includes a base substrate BS, color filters CF disposed on the base substrate BS, one or more black matrix BM disposed between the color filters CF, and one or more pixel PX defined therein. While a color filter and a pixel have been indicated by CF and PX, the reference characters CF and PX may be used to collectively indicate more than one color filter and more than one pixel.

The display device includes a plurality of pixels PX arranged in a matrix form with plural pixel rows and plural pixel columns. Since the pixels PX have the same configuration and function, for the convenience of explanation, hereinafter, only one pixel PX will be described in detail with reference to FIGS. 1 and 2A to 2C. Here, each pixel PX has a substantially rectangular planar shape elongated in one direction, but the planar shape of the pixel PX should not be limited to the rectangular shape. That is, the pixel PX may have various shapes, such as a 'V' shape, a 'Z' shape, etc., when viewed in a plan view.

The base substrate BS is a transparent or non-transparent insulating substrate, e.g., a silicon substrate, a glass substrate, a plastic substrate, etc. The base substrate BS includes pixel areas corresponding to the pixels PX in a one-to-one correspondence, and each pixel area includes a display area DA displaying an image, and a non-display area NDA disposed adjacent to one or more side of the display area DA and corresponding to an area except for the display area DA (e.g., a remaining portion of the pixel area).

The base substrate BS includes a line part disposed thereon to apply signals to the pixel PX and a thin film transistor TFT to drive the pixel PX. The line part and the thin film transistor TFT are disposed in the non-display area NDA of the pixel area.

The line part includes one or more gate line GL and one or more data line DL, which are disposed in the non-display area NDA of the pixel area.

The gate line GL lengthwise extends in a first direction D1 on the base substrate BS.

The data line DL is disposed on the base substrate BS and is insulated from the gate line GL by a first insulating layer INS1 interposed between the gate line GL and the data line DL. The first insulating layer INS1 is disposed on the base substrate BS to cover the gate line GL. The first insulating layer INS1 includes an insulating material, e.g., silicon nitride, silicon oxide, etc. The data line DL lengthwise extends in a second direction D2 which crosses the first direction D1.

The thin film transistor TFT is connected to the gate line GL and the data line DL, and includes a gate electrode GE, a semiconductor layer SM, a source electrode SE and a drain electrode DE.

The gate electrode GE is continuous with and protruded from the gate line GL or disposed on a portion of the gate line GL. The gate line GL and the gate electrode GE include a metal material. The gate line GL and the gate electrode GE may include nickel, chromium, molybdenum, aluminum, titanium, copper, tungsten, or an alloy thereof. The gate line GL and the gate electrode GE may have a single-layer cross-sectional structure or a multi-layer cross-sectional structure of the above-mentioned metal materials. In one exemplary embodiment, for instance, the gate line GL and the gate electrode GE have a triple-layer cross-sectional structure of molybdenum, aluminum and molybdenum, which are sequentially stacked on one another, a double-layer structure of titanium and copper sequentially stacked, or a single-layer structure of an alloy of titanium and copper.

The first insulating layer INS1 is disposed over the base substrate BS to cover the gate electrode GE.

The semiconductor layer SM is provided on the first insulating layer INS1 to substantially correspond to the gate line GL. The source electrode SE is continuous with and branched from the data line DL, and overlapped with the semiconductor layer SM. The drain electrode DE overlaps with the semiconductor layer SM and is spaced apart from the source electrode SE, to expose a portion of the semiconductor layer SM. The semiconductor layer SM serves as a conductive channel between the source electrode SE and the drain electrode DE.

The source electrode SE and the drain electrode DE may include a conductive material, e.g., a metal material. Each of the source electrode SE and the drain electrode DE may include a single metal, two or more metals, or a metal alloy. In one exemplary embodiment, for instance, each of the source electrode SE and the drain electrode DE includes nickel, chromium, molybdenum, aluminum, titanium, copper, tungsten, or an alloy thereof. In addition, each of the source electrode SE and the drain electrode DE may have a single-layer structure or a multi-layer cross-sectional structure. In one exemplary embodiment, for example, each of the source and drain electrodes SE and DE may have a double-layer cross-sectional structure of titanium and copper.

Each of the color filters CF allows a light passing through a corresponding pixel PX of the pixels PX to have color. The color filters CF may include a red color filter, a green color filter and a blue color filter, but are not limited thereto or thereby. The red, green and blue color filters are arranged to correspond to the pixels PX in one-to-one correspondence. In addition, the color filters CF may further include a white color filter. The color filters CF may be arranged to allow adjacent pixels PX to each other to have different colors. Although not shown in figures, the color filters CF adjacent to each other may be partially overlapped with each other in a boundary portion between the adjacent pixels PX.

The black matrix BM is disposed in the non-display area NDA to block the light which is not necessary to display the image. The black matrix BM reduces or effectively prevents light leakage from occurring at the edge of the image display layer such as liquid crystal molecules of a liquid crystal layer, or reduces or effectively prevent mixed colors from being viewed, such as when color filters CF overlap at the edge of the pixels PX. The black matrix BM is provided at one or more side of each color filter CF, and preferably surrounds each color filter CF in the plan view.

The black matrix BM is provided with a contact hole CH defined therethrough to expose a portion of the drain electrode DE of the thin film transistor TFT.

Although not shown in figures, a protective layer may be disposed between the thin film transistor TFT and the color filters CF to protect the channel of the thin film transistor TFT. The protective layer covers the exposed portion of the semiconductor layer SM.

The pixel PX is disposed on the base substrate BS. The pixel includes a cover layer CVL that defines a tunnel-shaped cavity TSC together with the base substrate BS, a support part SP that supports the cover layer CVL, a liquid crystal layer LC disposed in the tunnel-shaped cavity TSC, an alignment layer ALN that aligns the liquid crystal molecules of the liquid crystal layer LC, an electrode unit that controls the liquid crystal layer LC, e.g., first and second electrodes EL1 and EL2. The display area DA may be divided into a plurality of domains DM1, DM2, DM3 and DM4 in which the liquid crystal molecules of the liquid crystal layer LC are respectively aligned in different directions. The liquid crystal layer LC may not be provided in the non-display area NDA.

The first electrode EL1 is disposed on the color filter CF and connected to the thin film transistor TFT through the contact hole CH defined in the black matrix BM. A second insulating layer INS2 is disposed on the first electrode EL1 to protect the first electrode EL1. In an alternative exemplary embodiment, the second insulating layer INS2 may be omitted. The second insulating layer INS2 may include an inorganic insulating material or an organic insulating material.

In the illustrated exemplary embodiment, the contact hole CH is formed by partially removing the black matrix BM, but should not be limited thereto or thereby. That is, the contact hole CH may be formed by partially removing the color filter CF.

The cover layer CVL lengthwise extends in the first direction D1 on the second insulating layer INS2. The cover layer CVL is upwardly (e.g., cross-sectionally away from the base substrate BS) spaced apart from an upper surface of the second insulating layer INS2 to define the tunnel-shaped cavity TSC in cooperation with the second insulating layer INS2. In other words, the cover layer CVL is upwardly spaced apart from the upper surface of the second insulating layer INS2 in the display area DA to form a predetermined space between the cover layer CVL and the second insulating layer INS2. The cover layer CVL directly makes contact with the second electrode EL2 along the second direction D2 in the non-display area NDA so as not to form the predetermined space between the cover layer CVL and the second insulating layer INS2. As a result, the tunnel-shaped cavity TSC has a shape lengthwise extended in the second direction D2. Both end portions of the tunnel-shaped cavity TSC, i.e., an end portion of the tunnel-shaped cavity TSC in the second direction D2 and an end portion of the tunnel-shaped cavity TSC in the opposite direction to the second direction D2, are opened since the cover layer CVL is not disposed overlapping the both end portions of the tunnel-shaped cavity TSC. The opened portions of the tunnel-shaped cavity TSC will be referred to as entrance portions. However, the direction in which the cover layer CVL extends should not be limited thereto or thereby.

The cover layer CVL includes an organic or inorganic insulating layer. In addition, the cover layer CVL has a single-layer cross-sectional structure, but it should not be limited to the single-layer cross-sectional structure. That is, the cover layer CVL may have a multi-layer cross-sectional structure, e.g., a triple-layer cross-sectional structure. In one exemplary embodiment, the cover layer CVL has the triple-layer cross-sectional structure of the inorganic insulating layer, the organic insulating layer and the inorganic insulating layer, which are sequentially stacked.

The second electrode EL2 is disposed on a lower surface of the cover layer CVL and lengthwise extended in the first direction D1 in which the cover layer CVL is extended. In addition, the second electrode EL2 forms an electric field together with the first electrode EL1. The second electrode EL2 is shared by the pixels PX arranged in the extension direction of the second electrode EL1, i.e., the first direction, spaced apart upward from the second insulating layer INS2 in the display area DA, and directly makes contact with the second insulating layer INS2 in the non-display area NDA.

The second electrode EL2 is connected to a common voltage line (not shown) which is in the non-display area NDA. The second electrode EL2 receives a common voltage from the common voltage line.

The first and second electrodes EL1 and EL2 may include a transparent conductive material or a non-transparent conductive material, e.g., a metal material. That is, in the illustrated exemplary embodiment, the first and second electrodes EL1 and EL2 include the transparent or non-transparent conductive material in accordance with an operation mode of the display device. In one exemplary embodiment, for instance, where the display device is a transmission type display device in which a backlight unit is disposed under the base substrate BS, the first and second electrodes EL1 and EL2 include the transparent conductive material. Where the display device is a reflection type display device that does not need to have a separate light source, the first electrode EL1 includes the non-transparent conductive material that is able to reflect the light and the second electrode EL2 includes the transparent conductive material. The transparent conductive material includes a transparent conductive oxide, e.g., indium tin oxide ("ITO", indium zinc oxide ("ITO"), indium tin zinc oxide ("ITZO"), etc. The non-transparent conductive material includes the metal material, e.g., nickel, chromium, molybdenum, aluminum, titanium, copper, tungsten, or an alloy thereof. The other elements may be the transparent or non-transparent conductive material in accordance with the operation mode of the display device.

The support part SP is provided at a position corresponding to the entrance portions. When viewed in a plan view, the support part SP is partially overlapped with a portion corresponding to the entrance portions or when the support part SP is not overlapped with the portion corresponding to the entrance portions, the support part is disposed in the non-display area NDA immediately adjacent to the entrance portions. In the illustrated exemplary embodiment, the support part SP is disposed in the non-display area NDA immediately adjacent to the entrance portions.

The support part SP is continuous with and extended from the cover layer CVL. The support part SP is disposed between the second insulating layer INS2 and a remaining portion of the cover layer CVL to have a column shape in the plan view, and thus the support part SP directly makes contact with the second insulating layer INS2. As discussed above, the tunnel-shaped cavity TSC has a shape lengthwise extended in the second direction D2. A width of the tunnel-shaped cavity TSC is taken perpendicular to the lengthwise direction, and is extended in the first direction D1.

The support part SP may be provided on a virtual line extended from a center portion of the width of the tunnel-shaped cavity TSC, and in the lengthwise second direction D2 of the tunnel-shaped cavity TSC, so that the support part SP blocks a portion of the entrance portions. Where the support part SP extends from the center portion of the width of the tunnel-shaped cavity TSC, each of the entrance portions respectively at the both end portions of the tunnel-shaped cavity TSC, i.e., an end portion of the tunnel-shaped cavity TSC in the second direction D2 and an end portion of the tunnel-shaped cavity TSC in the opposite direction to the second direction D2, are divided into two portions by the support part SP, and thus the liquid crystal layer LC is provided into the tunnel-shaped cavity TSC through the two entrance portions when the display device is manufactured.

In an exemplary embodiment of manufacturing the display device, the support part SP is formed through the same process as that of the cover layer CVL, and thus the support part SP is formed of the same material and in a same layer of the display device as the cover layer CVL. In addition, the support layer SP may be integrally formed with the cover layer CVL, such that the support part SP and the cover layer CVL may form a single, unitary, indivisible member. An exemplary embodiment of a method of forming the support part SP will be described in detail later.

The liquid crystal layer LC is disposed in the tunnel-shaped cavity TSC. According to the illustrated exemplary embodiment, the liquid crystal layer LC is disposed between the first electrode EL1 and the second electrode EL, which face each other, and is controlled by the electric field to display the image.

The liquid crystal layer LC includes the liquid crystal molecules having an optical anisotropic property. The liquid crystal molecules are driven by the electric field to block or transmit the light passing through the liquid crystal layer LC, to thereby display a desired image.

The alignment layer ALN is disposed between the first electrode EL1 and the liquid crystal layer LC and between the second electrode EL2 and the liquid crystal layer LC. The alignment layer ALN is used to pretilt the liquid crystal molecules of the liquid crystal layer LC and includes an organic polymer, e.g., polyimide and/or polyamic acid.

In an alternative exemplary embodiment of the invention, an additional inorganic insulating layer may be disposed between the liquid crystal layer LC and the second electrode EL2 and/or between the second electrode EL2 and the cover layer CVL. The inorganic insulating layer includes silicon nitride or silicon oxide. The inorganic insulating layer supports the cover layer CVL such that the tunnel-shaped cavity TSC is stably maintained.

A sealant layer SL is disposed on the cover layer CVL. The sealant layer SL covers the display area DA and the non-display area NDA. The sealant layer SL blocks the both end portions (e.g., the entrance portions) of the tunnel-shaped cavity TSC to seal the tunnel-shaped cavity TSC. That is, the space of the tunnel-shaped cavity TSC is defined by the second insulating layer INS2 (or the first electrode EL1 when the second insulating layer INS2 is omitted), the second electrode EL2, and the sealant layer SL. The support part SP of the cover layer may also define the space of the tunnel-shaped cavity TSC.

The sealant layer SL includes an organic polymer, e.g., poly(p-xylene) polymer (i.e., parylene).

The optical member is used to change the optical state of the light passing through the liquid crystal layer LC, e.g., delaying a phase of the light or polarizing the light. To this end, the optical member includes first and second polarizing plates POL1 and POL2. The optical member may further include first and second quarter-wavelength plates.

The first polarizing plate POL1 and the second polarizing plate POL2 are respectively disposed on both of opposing surfaces of the display panel DP. The first quarter-wavelength plate is disposed between the display panel DP and the first polarizing plate POL1 and the second quarter-wavelength plate is disposed between the display panel DP and the second polarizing plate POL2. The first polarizing plate POL1 has a polarizing axis extended in a predetermined direction perpendicular to a direction of a polarizing axis of the second polarizing plate POL2. The first quarter-wavelength plate has a long axis substantially perpendicular to a long axis of the second quarter-wavelength plate.

The liquid crystal layer LC having the above-mentioned structure is driven by an electrically controlled birefringence ("ECB") mode in which the liquid crystal molecules are positive-type liquid crystal molecules. However, a part of the optical member may be omitted or further include additional parts in accordance with the type of the liquid crystal layer LC, e.g., a positive-type or a negative-type, and the driving mode of the display device, e.g., an in-plane switching mode, a vertical alignment mode, the ECB mode, etc. In addition, the arrangement of the polarizing axis of the first and second polarizing plates POL1 and POL2 and the long axis of the first and second quarter-wavelength plates may be changed according to the type of the liquid crystal layer LC and the driving mode of the display device.

In the exemplary embodiment of the display device according to the invention, when a gate signal is applied to the gate electrode GE through the gate line GL and a data signal is applied to the source electrode SE through the data line DL, the conductive channel (hereinafter, referred to as channel) is formed in the semiconductor layer SM. Accordingly, the thin film transistor TFT is turned on and the data signal is applied to the first electrode EL1, and thus the electric field is formed between the first electrode EL1 and the second electrode EL2. The liquid crystal molecules are driven in accordance with the electric field and the amount of the light passing through the liquid crystal layer LC is controlled, thereby displaying a desired image.

FIG. 3 is a flowchart showing an exemplary embodiment of a method of manufacturing the display device according to the invention.

Referring to FIG. 3, the thin film transistor TFT and the color filters CF are formed (e.g., provided) on the base substrate BS (S110 and S120). Then, the first electrode EL1, a sacrificial layer SCR, the second electrode EL2 and the support part SP/the cover layer CVL are sequentially formed on the color filters CF (S130, S140, S150 and S160), and the sacrificial layer SCR is removed (S170). After that, the alignment layer ALN is formed (S180), the liquid crystal layer LC is formed (S190), and the sealant layer SL is formed to seal the liquid crystal layer LC (S200). Then, the optical member is attached (S210).

FIGS. 4A, 5A, 6A, 7A and 8A are plan views showing a display device provided by a portion of an exemplary embodiment of a manufacturing method of the display device according to the invention, and FIGS. 4B, 5B, 6B, 7B and 8B are cross-sectional views taken along line I-I' of FIGS. 4A, 5A, 6A, 7A and 8A, respectively. FIGS. 9A, 10A, 11A, 12A, 13A, 14A, 15A, 16A, 17A and 18A are cross-sectional views showing the display device provided by a remaining portion of the manufacturing method, taken along line II-II' of FIG. 8A, and FIGS. 9B, 10B, 11B, 12B, 13B, 14B, 15B, 16B, 17B and 18B are cross-sectional views showing the display device provided by the remaining portion of the manufacturing method, taken along line III-III' of FIG. 8A.

Figure 4A:
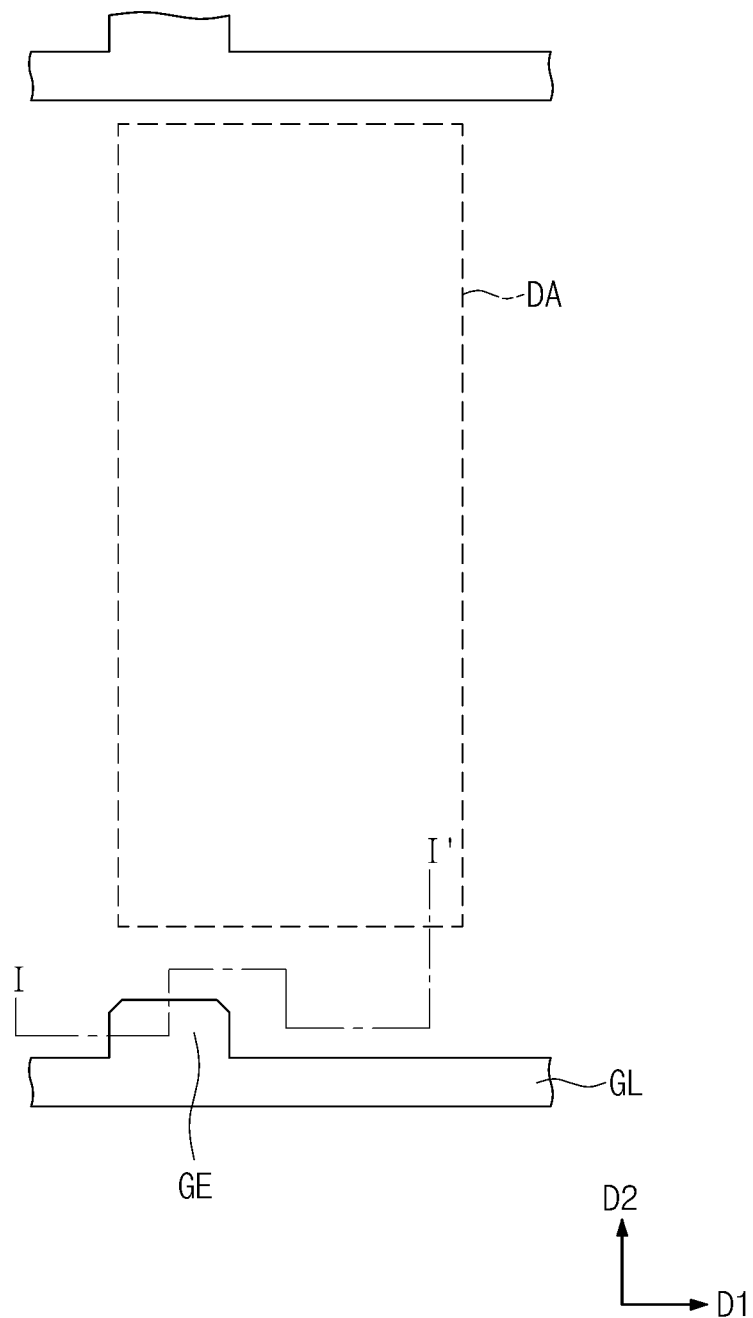
FIGS. 4A, 5A, 6A, 7A and 8A are plan views showing a display device provided by a portion of an exemplary embodiment of a manufacturing method of the display device according to the invention.
Figure 4B:
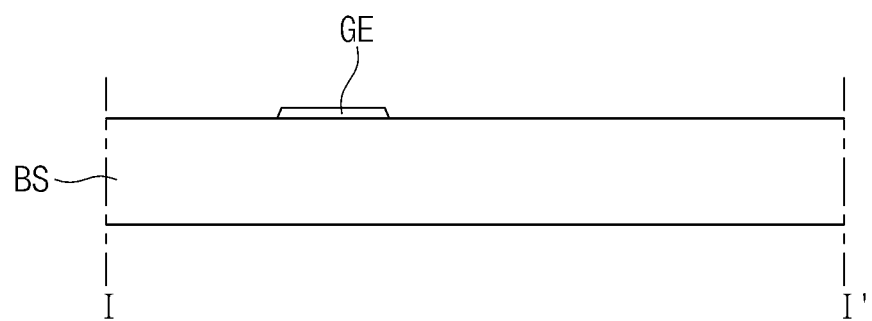
FIGS. 4B, 5B, 6B, 7B and 8B are cross-sectional views taken along line I-I' of FIGS. 4A, 5A, 6A, 7A and 8A, respectively.

Referring to FIGS. 4A and 4B, a gate line part is formed (e.g., provided) on the base substrate BS. The gate line part includes the gate line GL and the gate electrode GE.

The gate line part is formed of a conductive material, e.g., metal. In one exemplary embodiment, for instance, the gate line part is formed by forming a metal layer over the base substrate BS and patterning the metal layer such as through a photolithography process. The gate line part is shown to have a single-layer cross-sectional structure of a single metal or alloy, but should not be limited to the single-layer structure. That is, the gate line part may have a multi-layer cross-sectional structure of two or more metals and/or a metal alloy.

Figure 5A:
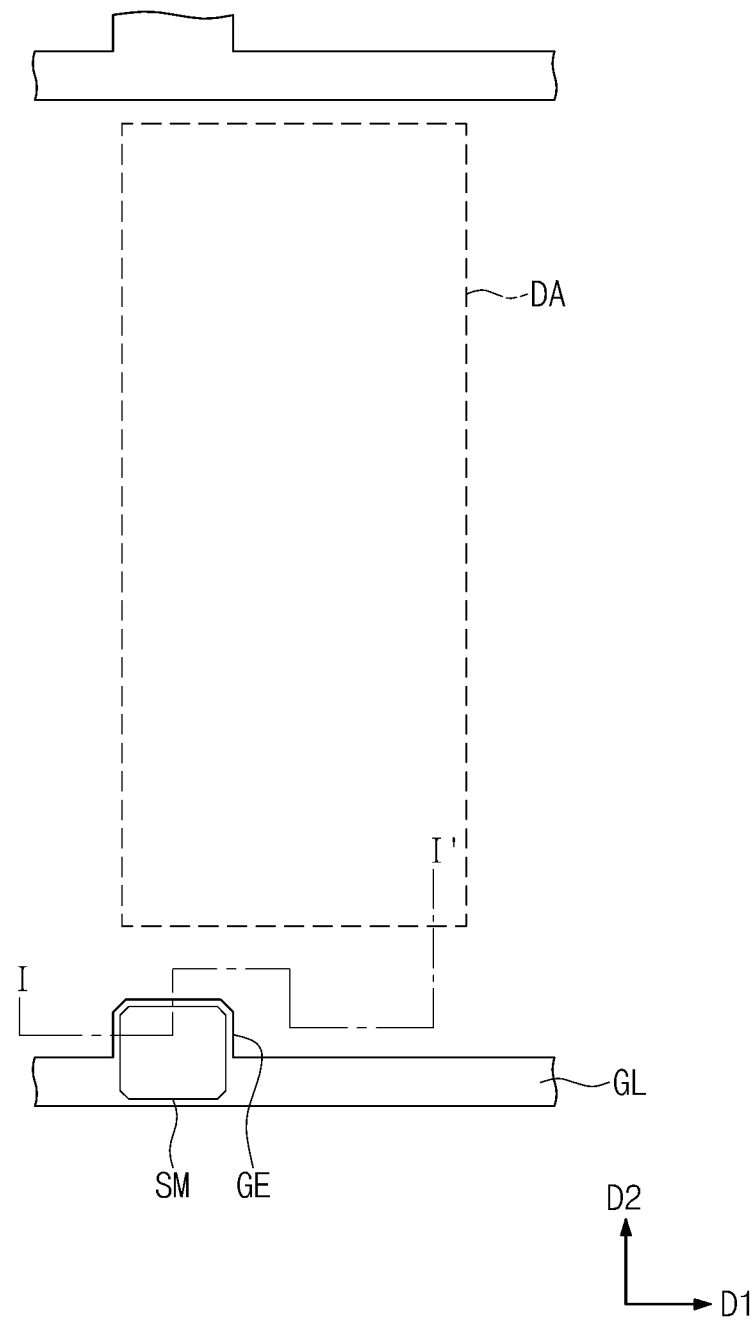
Figure 5B:
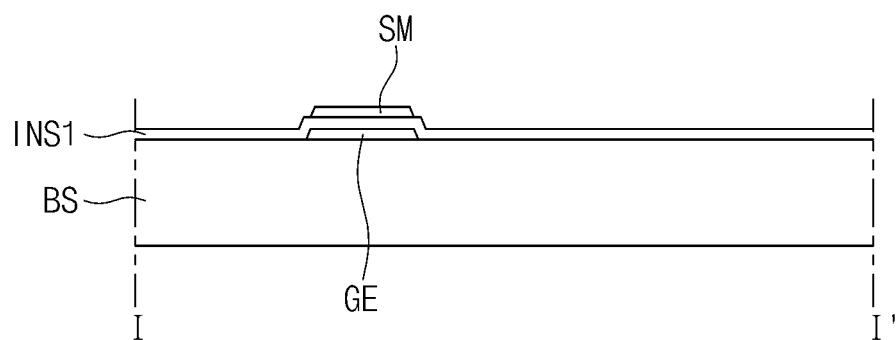

Referring to FIGS. 5A and 5B, the first insulating layer INS1 is formed on the gate line part and the semiconductor layer SM is formed on the first insulating layer INS1. The semiconductor layer SM is disposed on the gate electrode GE and overlapped with a portion of the gate electrode GE when viewed in a plan view. The semiconductor layer SM may be formed of a doped or non-doped silicon or oxide semiconductor.

Figure 6A:
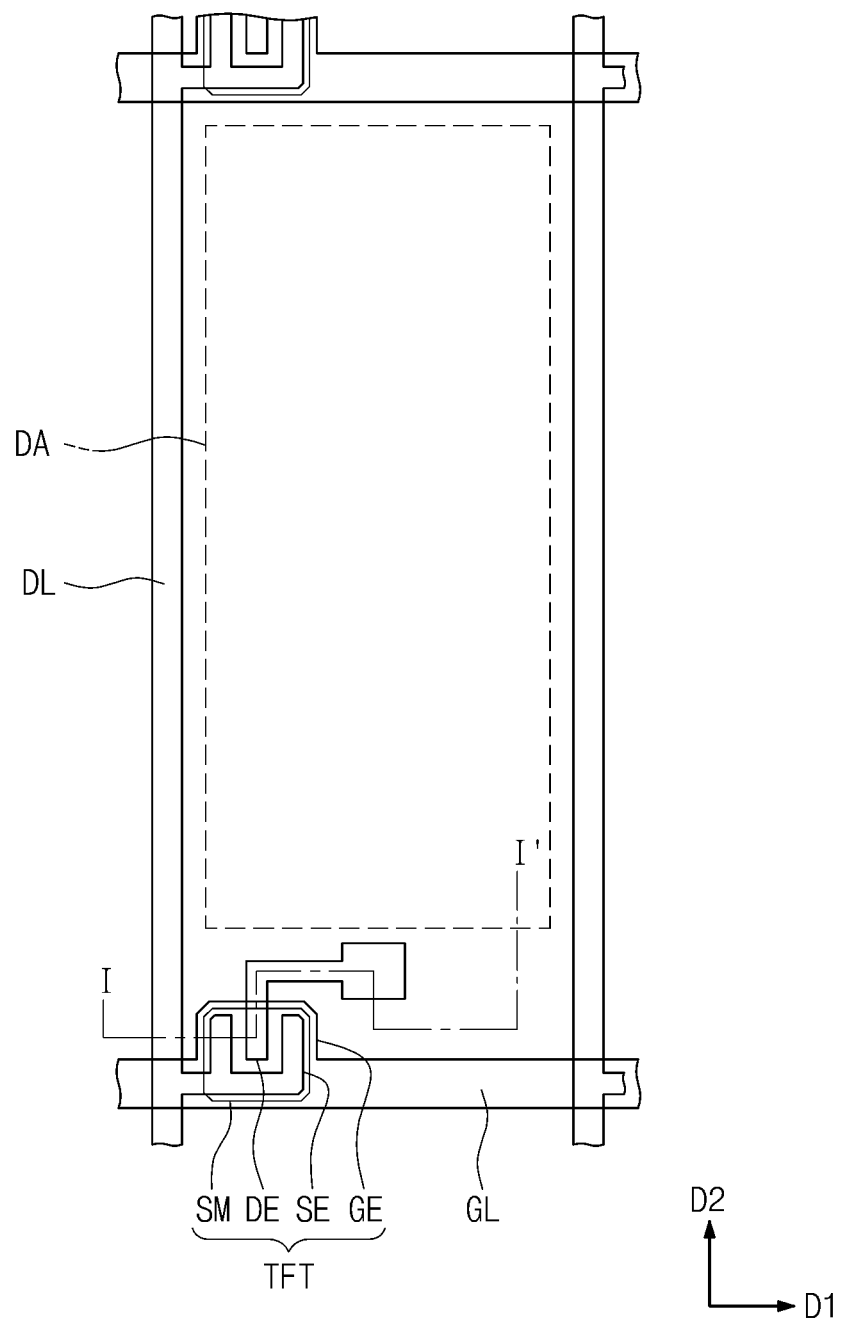
Figure 6B:
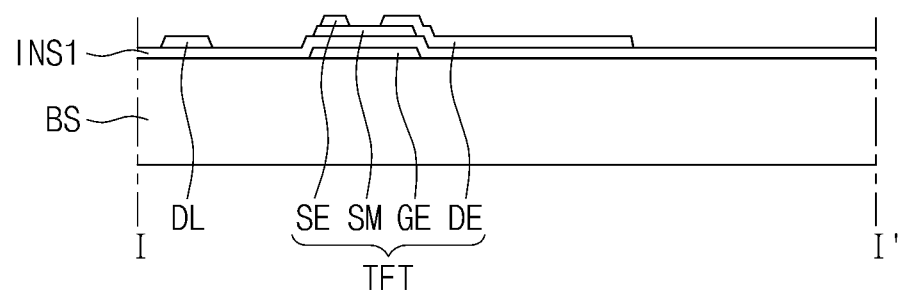

Referring to FIGS. 6A and 6B, a data line part is formed on the semiconductor layer SM. The data line part includes the data line DL, the source electrode SE and the drain electrode DE.

The data line part is formed of a conductive material, e.g., metal. In one exemplary embodiment, for instance, the data line part is formed by forming a metal layer over the base substrate BS and patterning the metal layer such as through a photolithography process. The data line part is shown to have a single-layer cross-sectional structure of a single metal or alloy, but should not be limited to the single-layer structure. That is, the gate line part may have a multi-layer cross-sectional structure of two or more metals and/or a metal alloy.

The gate electrode GE, the source electrode SE, the drain electrode DE and the semiconductor layer SM, which are formed by the above-mentioned processes, form the thin film transistor TFT (S110).

Figure 7A:
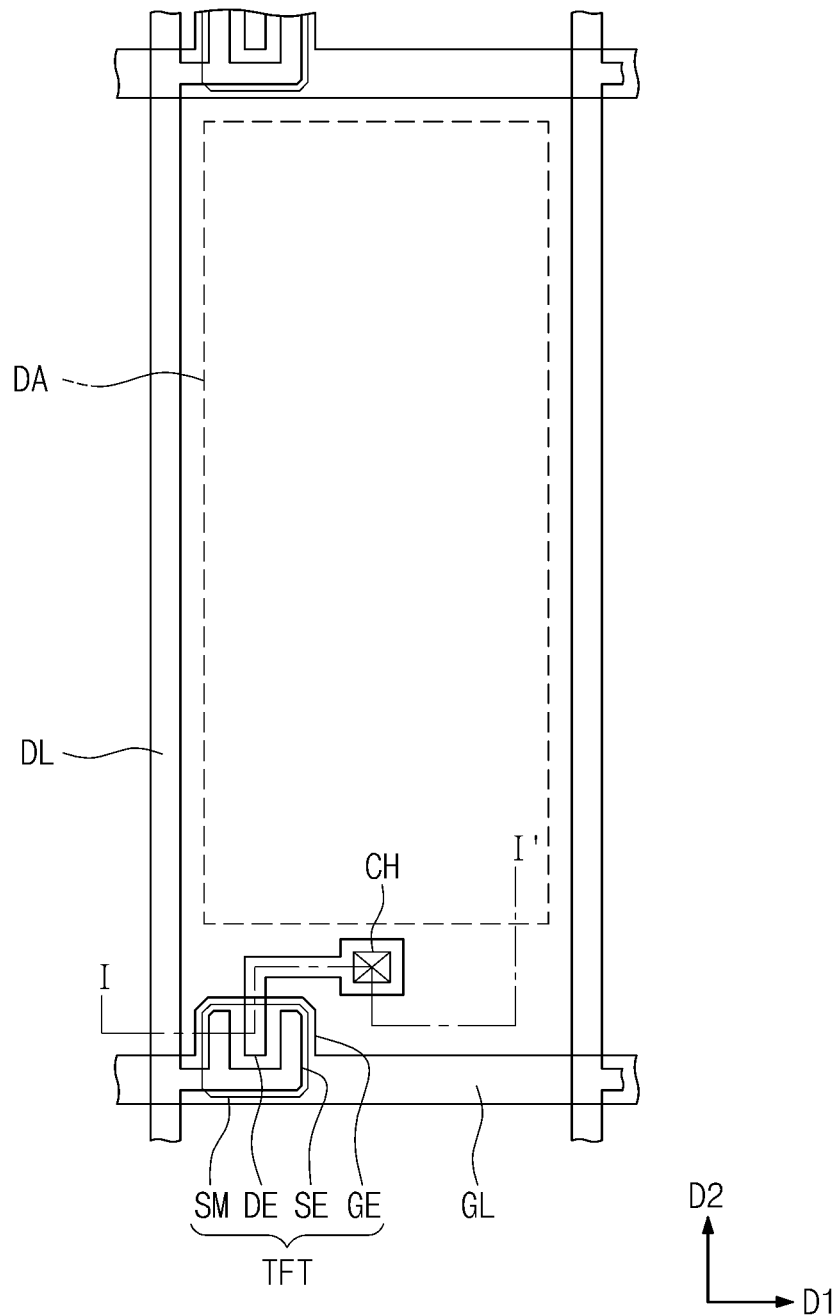
Figure 7B:
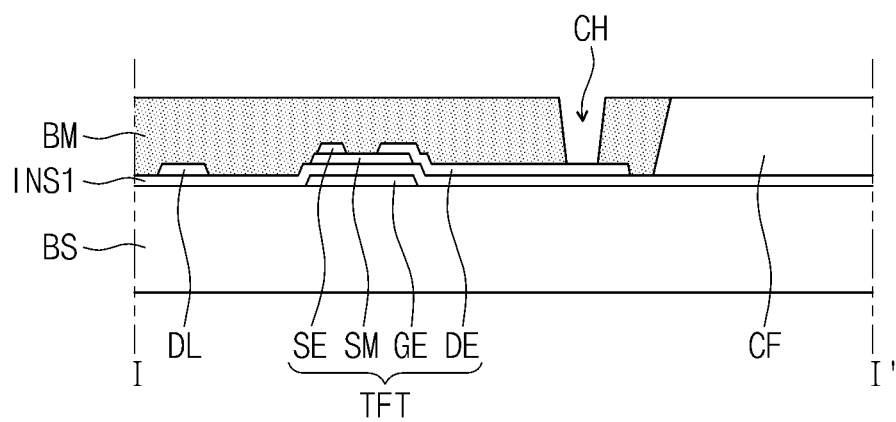

Referring to FIGS. 7A and 7B, the color filter CF and the black matrix BM are formed on the data line part (S120), and the contact hole CH is formed in the black matrix BM to expose the portion of the drain electrode DE.

The color filter CF is formed by forming a color layer representing a red color, a green color a blue color, or others on the base substrate BS and patterning the color layer such as by using a photolithography process. The method of forming the color filter CF should not be limited thereto or thereby. In an alternative exemplary embodiment, the color filter CF may be formed by an inkjet method instead of the photolithography process. The black matrix BM may be formed by forming a light blocking layer which absorbs light on the base substrate BS and patterning the light blocking layer using the photolithography process. In addition or alternatively, the black matrix BM may be formed by the inkjet method. The color layer of the color filter CF and the black matrix BM may be formed in various orders. In detail, the black matrix BM is formed after the red, green and blue color layers are formed, or alternatively, the red, green and blue color layers are formed after the black matrix BM is formed. In addition, the order of forming the color layers may be varied.

The contact hole CH is formed by patterning a portion of the first insulating layer INS1 and the black matrix BM such as by using a photolithography process.

In an exemplary embodiment of the invention, although not shown in figures, an additional insulating layer, e.g., the passivation layer, may be selectively formed between the thin film transistor TFT and the color filter CF. The additional insulating layer protects the channel portion of the thin film transistor TFT and reduces or effectively prevents diffusion of impurities from the color filter CF to the thin film transistor TFT.

Figure 8A:
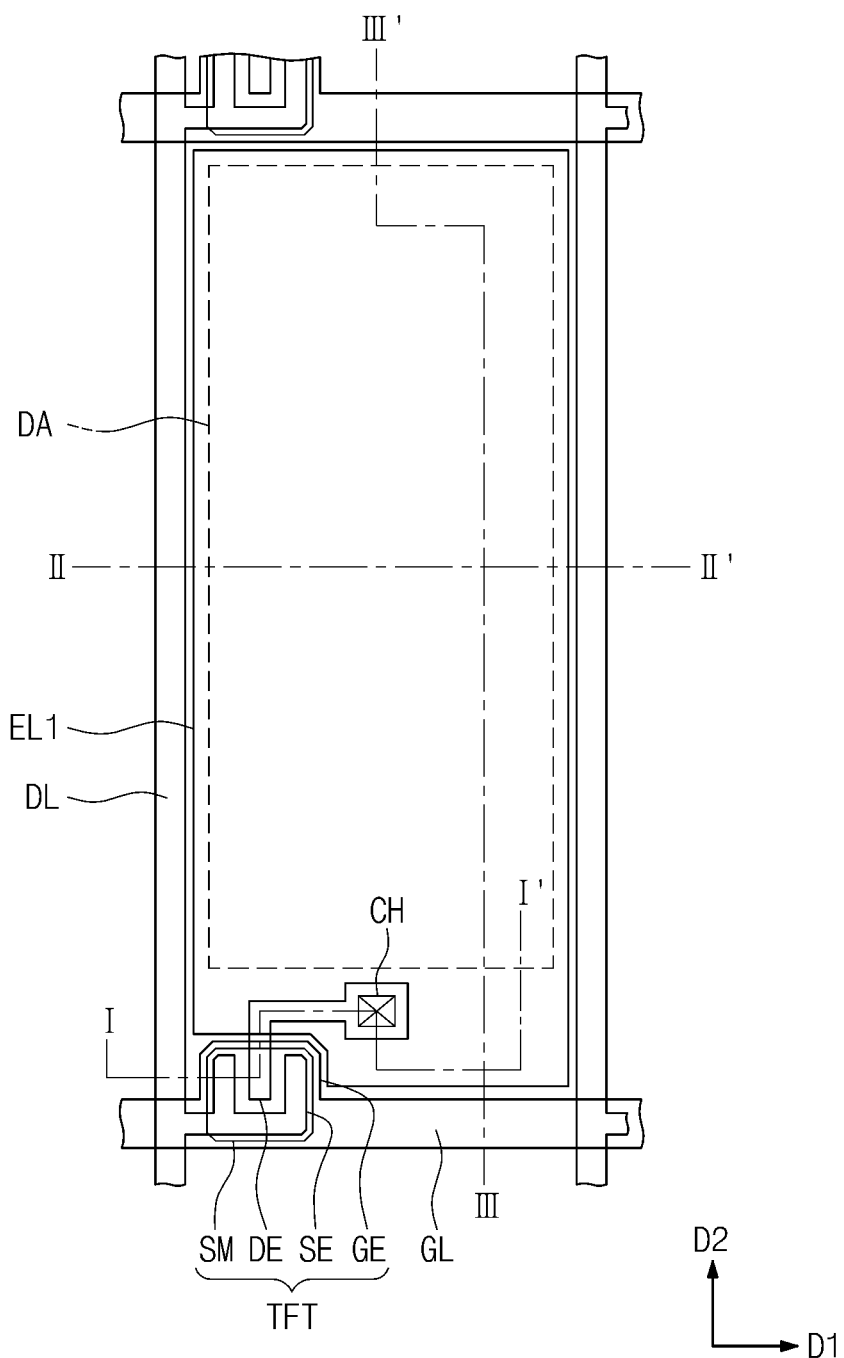
Figure 8B:
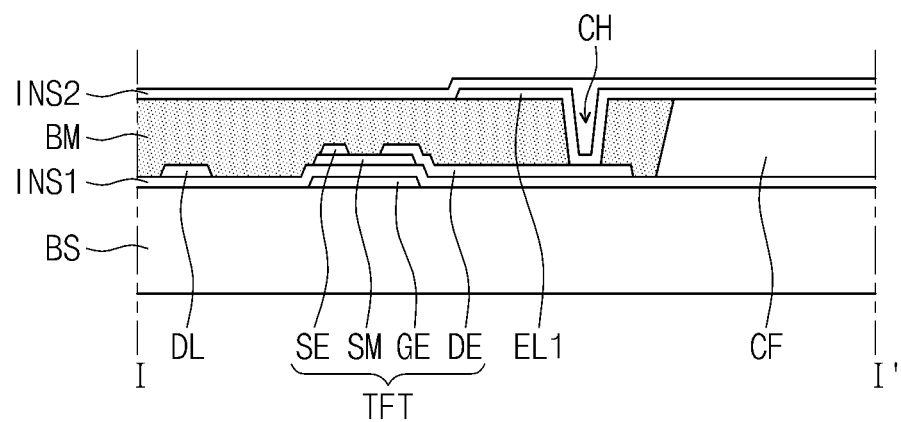

Referring to FIGS. 8A and 8B, the first electrode EL1 is formed on the color filter CF (S130).

The first electrode EL1 is formed by forming a conductive layer on the color filter CF using a conductive material and patterning the conductive layer such as through the photolithography process. The first electrode EL1 is connected to the drain electrode DE through the contact hole CH.

The second insulating layer INS2 is formed on the first electrode EL1 to protect the first electrode EL1.

Figure 9A:
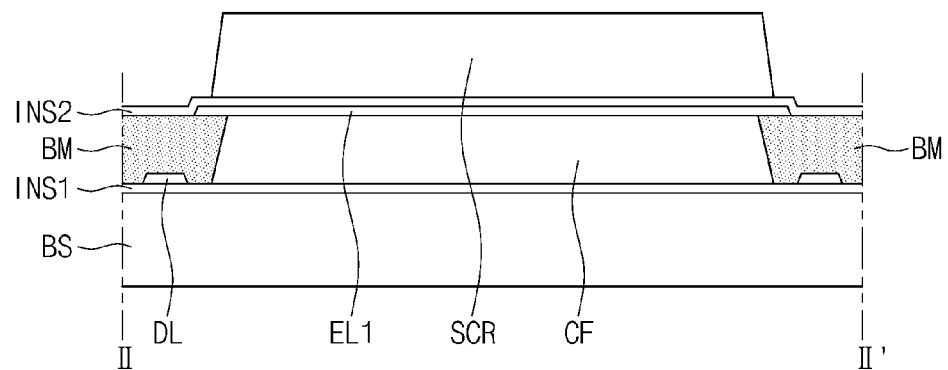
FIGS. 9A, 10A, 11A, 12A, 13A, 14A, 15A, 16A, 17A and 18A are cross-sectional views showing the display device provided by a remaining portion of the manufacturing method, taken along line II-II' of FIG. 8A.
Figure 9B:
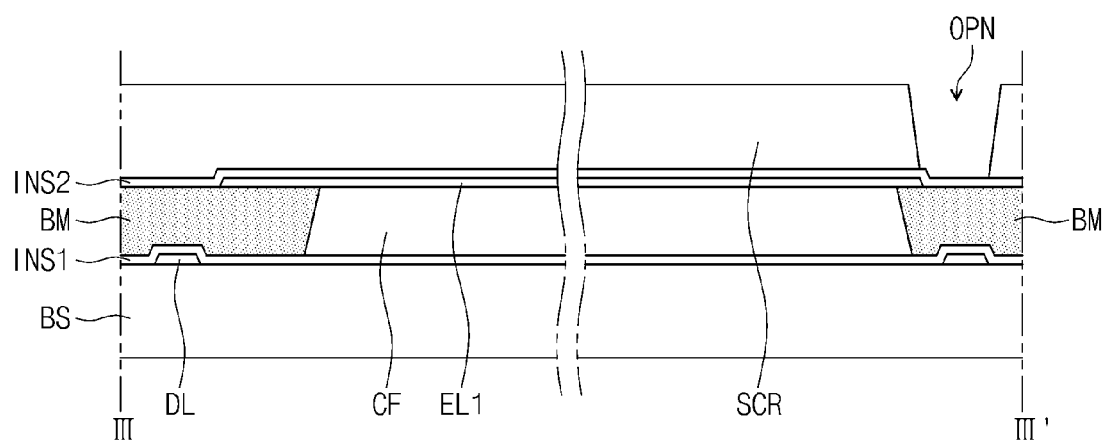
FIGS. 9B, 10B, 11B, 12B, 13B, 14B, 15B, 16B, 17B and 18B are cross-sectional views showing the display device provided by the remaining portion of the manufacturing method, taken along line III-III' of FIG. 8A.

Referring to FIGS. 9A and 9B, a sacrificial layer SCR is formed on the second insulating layer INS2 (S140).

The sacrificial layer SCR is formed to cover the display area DA and is lengthwise extended in the second direction D2. That is, the sacrificial layer SCR has a planar bar shape lengthwise extended along the column of the pixels when assuming that the first and second directions D1 and D2 are row and column directions, respectively, but the shape of the sacrificial layer SCR should not limited thereto or thereby. The sacrificial layer SCR may be lengthwise extended in the first direction D1.

The sacrificial layer SCR is formed in the area, in which the liquid crystal layer LC is formed, to have a width and a cross-sectional height respectively corresponding to the width and the cross-sectional height of the tunnel-shaped cavity TSC since the sacrificial layer is removed to form the tunnel-shaped cavity TSC.

The sacrificial layer SCR is not formed in the area in which the support part SP is formed. That is, the portion of the sacrificial layer SCR, which is formed in the area in which the support part SP is formed, is removed by the patterning process to form an opening portion OPN. By the opening portion OPN, the upper surface of the second insulating layer INS2 is exposed in the area at which the opening portion OPN is formed.

Figure 10A:
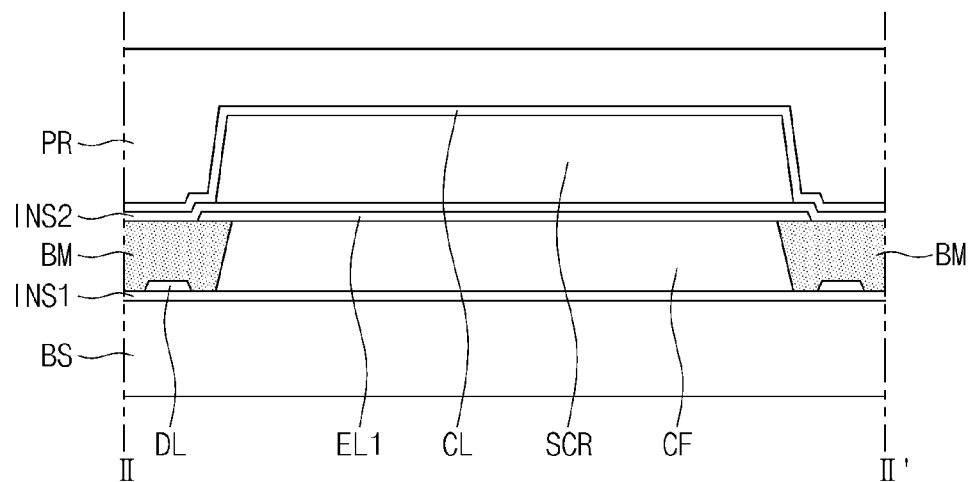
Figure 10B:
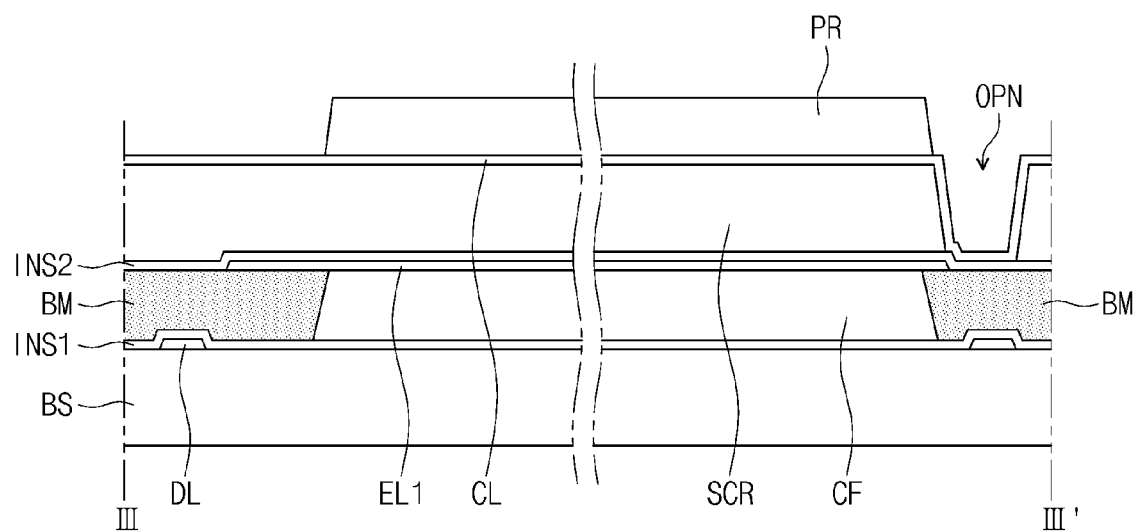

Referring to FIGS. 10A and 10B, a conductive layer is formed on the sacrificial layer SCR through which the opening portion OPN is formed, and a photoresist pattern PR is formed on the conductive layer.

The conductive layer is formed of the transparent conductive material, e.g., ITO, IZO, etc., and formed such as by using a physical vapor deposition method.

The photoresist pattern PR is formed in the area in which the second electrode EL2 is formed. The photoresist pattern PR is formed by coating a photoresist on the conductive layer, exposing the photoresist and developing the exposed photoresist.

Figure 11A:
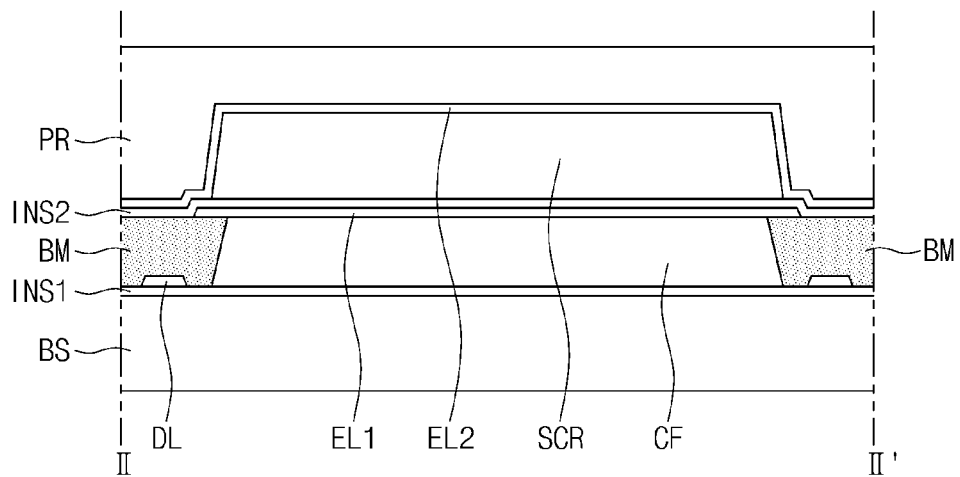
Figure 11B:
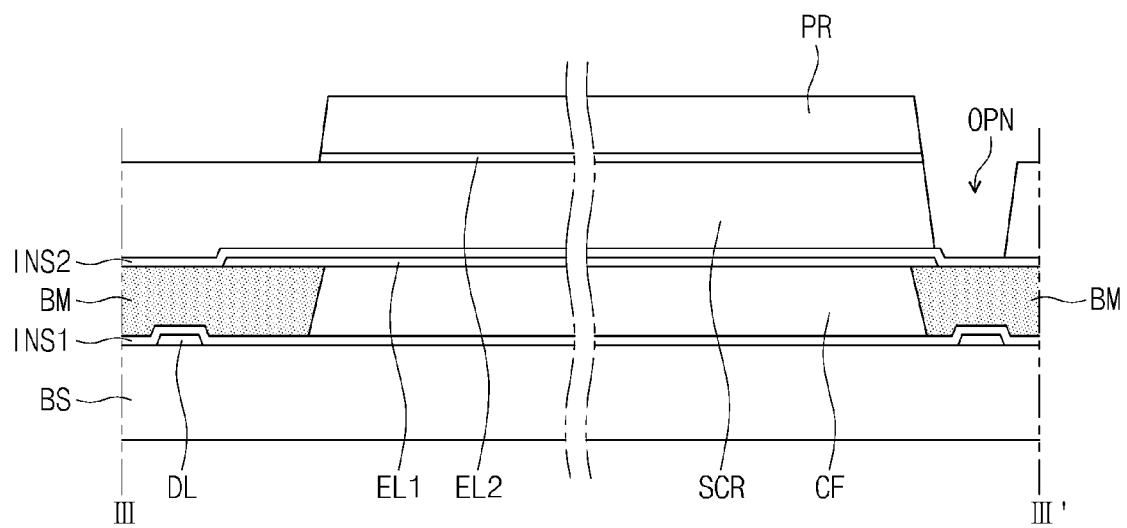

Referring to FIGS. 11A and 11B, the second electrode EL2 is formed on the sacrificial layer SCR (S150). The second electrode EL2 is formed by etching the conductive layer using the photoresist pattern PR as a mask.

Figure 12A:
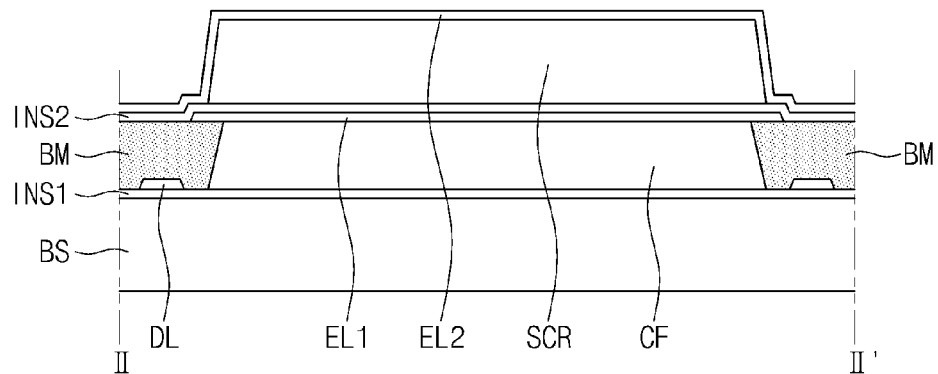
Figure 12B:
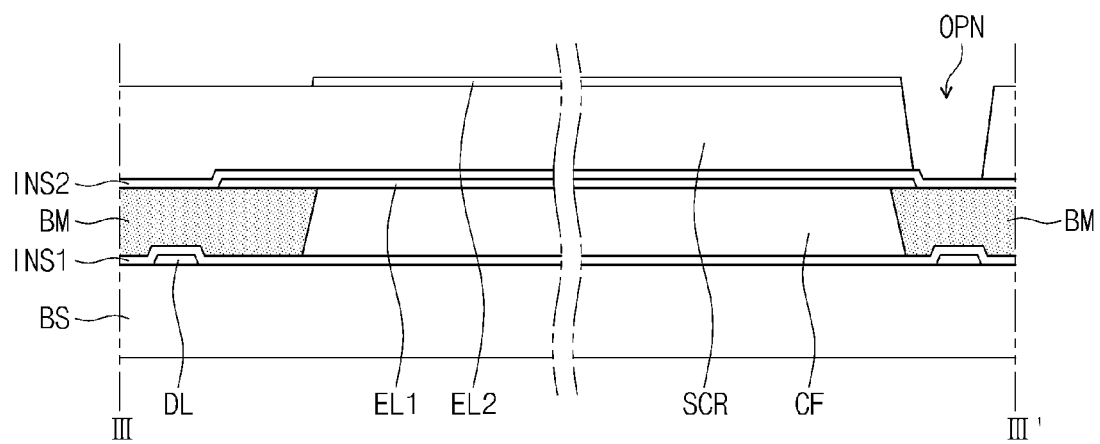

Referring to FIGS. 12A and 12B, the photoresist pattern PR is removed.

Figure 13A:
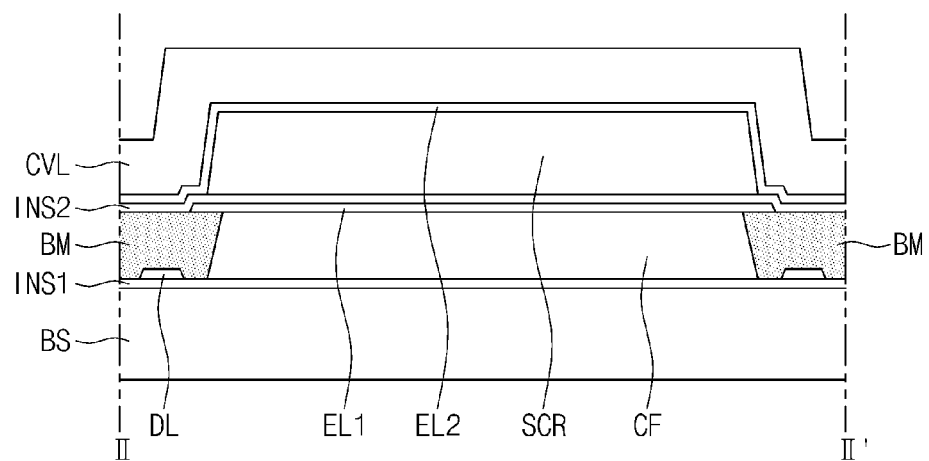
Figure 13B:
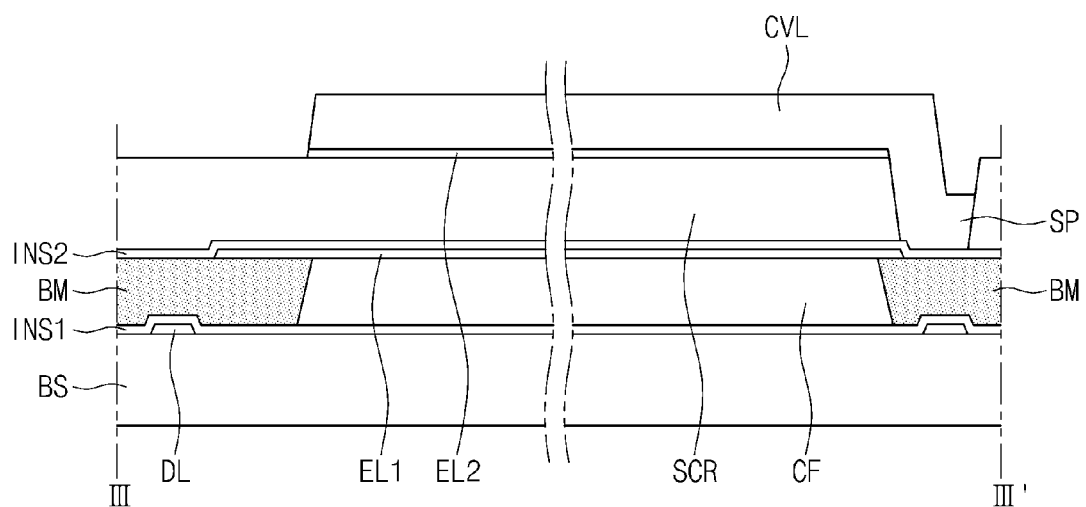

Referring to FIGS. 13A and 13B, the cover layer CVL and the support part SP are formed on the second electrode EL2 is formed (S160).

The cover layer CVL is extended in the first direction D1 to cover the second electrode EL2. Here, the second electrode EL2 and the cover layer CVL overlap with each other when viewed in a plan view and have substantially the same planar shape. However, the cover layer CVL may have a planar area larger than that of the second electrode EL2 to completely cover the second electrode EL2 in consideration of the design margin. The cover layer CVL is not formed at both end portions in the second direction D2 of the display area DA. Therefore, the upper surface of the sacrificial layer SCR corresponding to the end portions in the second direction D2 of the display area DA is exposed.

The support part SP is provided in the opening portion OPN. In the illustrated exemplary embodiment, the support part SP is continuously extended from the cover layer CVL and integrally formed with the cover layer CVL so as to form a single, unitary, indivisible member.

Figure 14A:
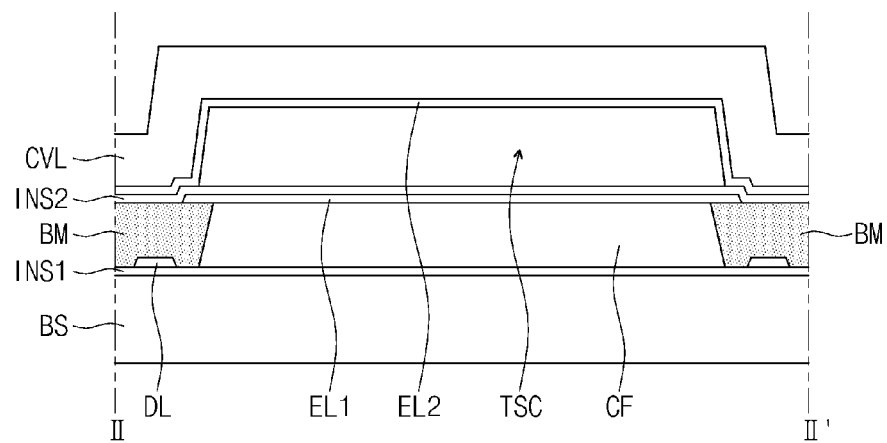
Figure 14B:
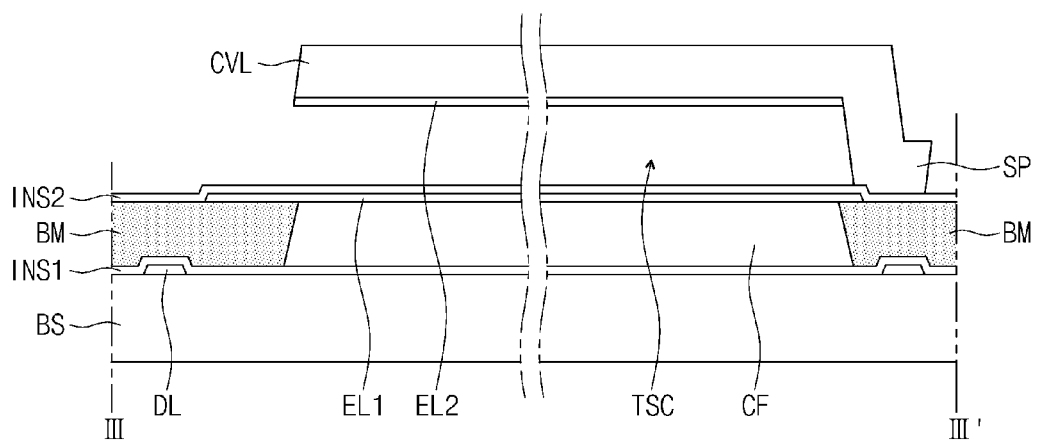

Referring to FIGS. 14A and 14B, the sacrificial layer SCR is removed by a dry etch process or a wet etch process to form the tunnel-shaped cavity TSC (S170). The dry etch process may be performed using plasma and the wet etch process may be performed using various etchants according to materials used to form the sacrificial layer SCR. The sacrificial layer SCR is etched from the exposed upper surface thereof at the both end portions in the second direction D2 of the display area DA. Thus, the upper surface of the second insulating layer INS2 and the lower surface of the second electrode EL2 are exposed, and the tunnel-shaped cavity TSC is defined by the upper surface of the second insulating layer INS2, the lower surface of the second electrode EL2, and the both end portions in the second direction D2 of the display area DA.

The support part SP is provided at the entrance portions of the tunnel-shaped cavity TSC. In detail, the support part SP is provided to each entrance portion, so that each entrance portion are divided into two access portions.

In an exemplary embodiment of the invention, an inorganic insulating layer is formed on the sacrificial layer SCR before the second electrode EL2 is formed and additional inorganic insulating layer is formed on the second electrode EL2 before the cover layer CVL is formed. The inorganic insulating layer supports the cover layer CVL to allow the cover layer CVL to stably maintain the tunnel-shaped cavity TSC when the sacrificial layer SCR is etched.

Figure 15A:
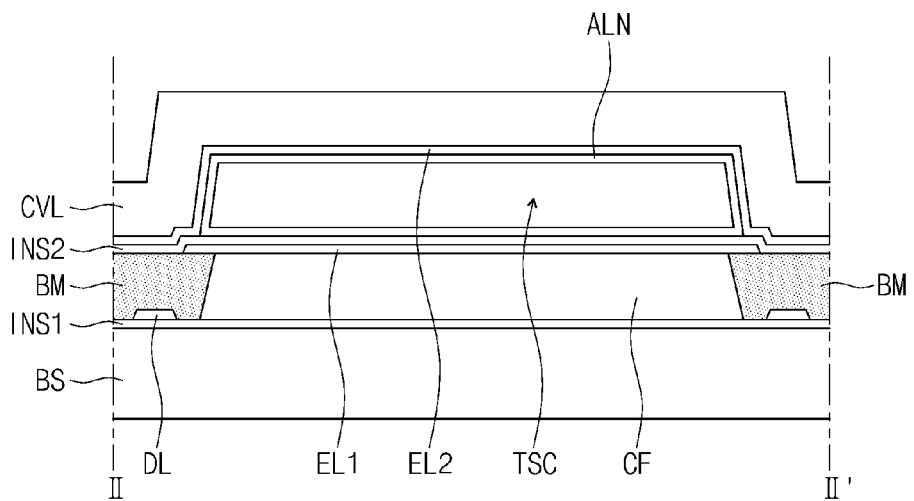
Figure 15B:
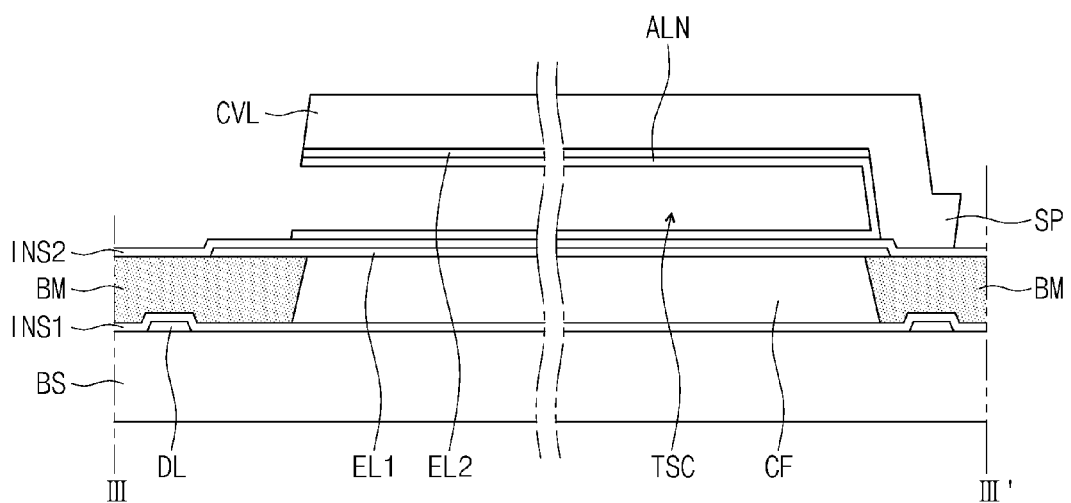

Referring to FIGS. 15A and 15B, the alignment layer ALN is formed in the tunnel-shaped cavity TSC (S180). The alignment layer ALN is formed by providing an alignment solution containing an alignment material, e.g., the organic polymer of polyimide or polyamic acid, and a solvent into the tunnel-shaped cavity TSC and lowering pressure or applying heat.

Figure 16A:
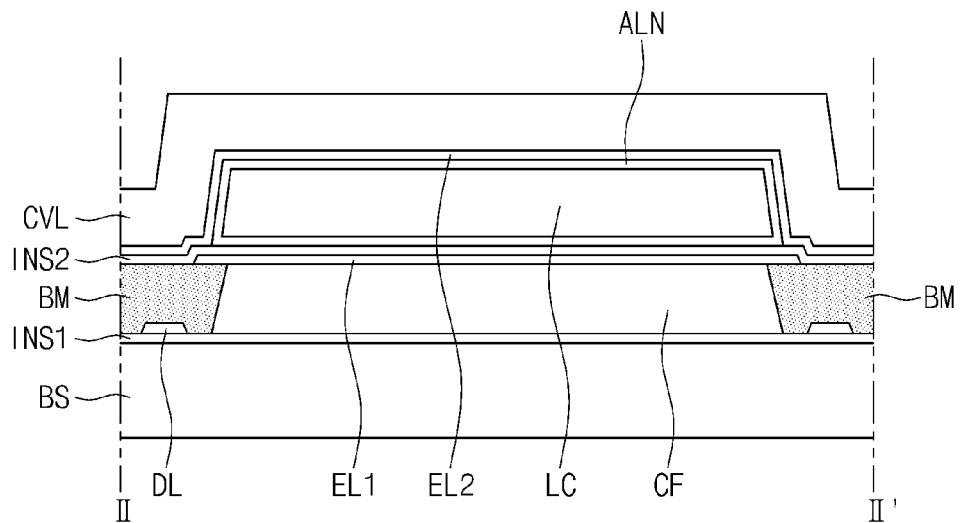
Figure 16B:
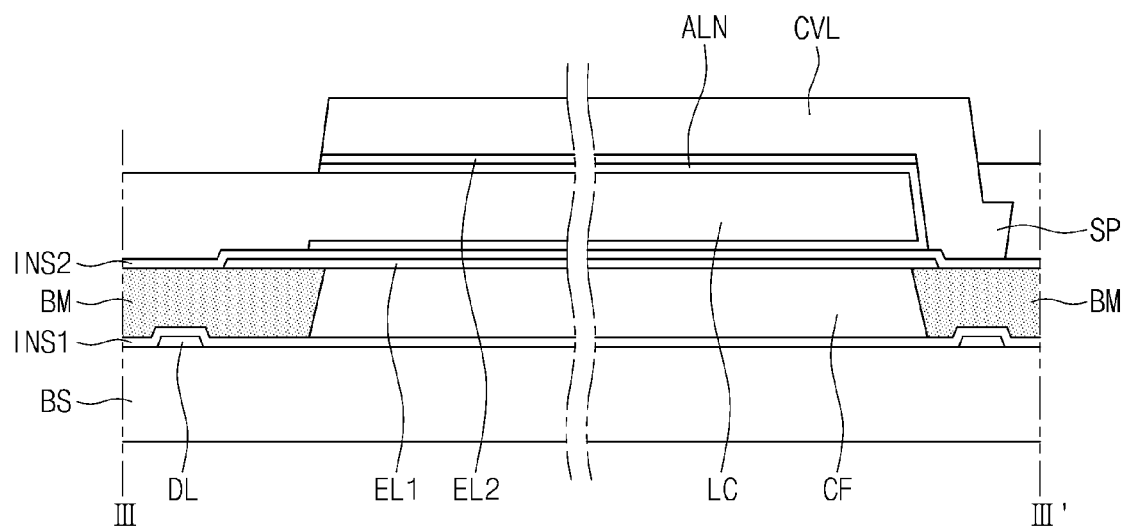
Figure 17A:
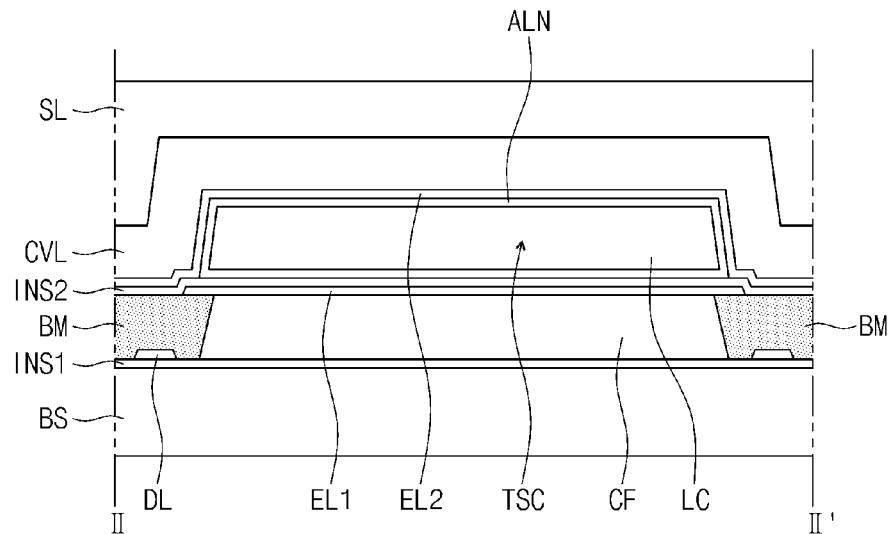
Figure 17B:
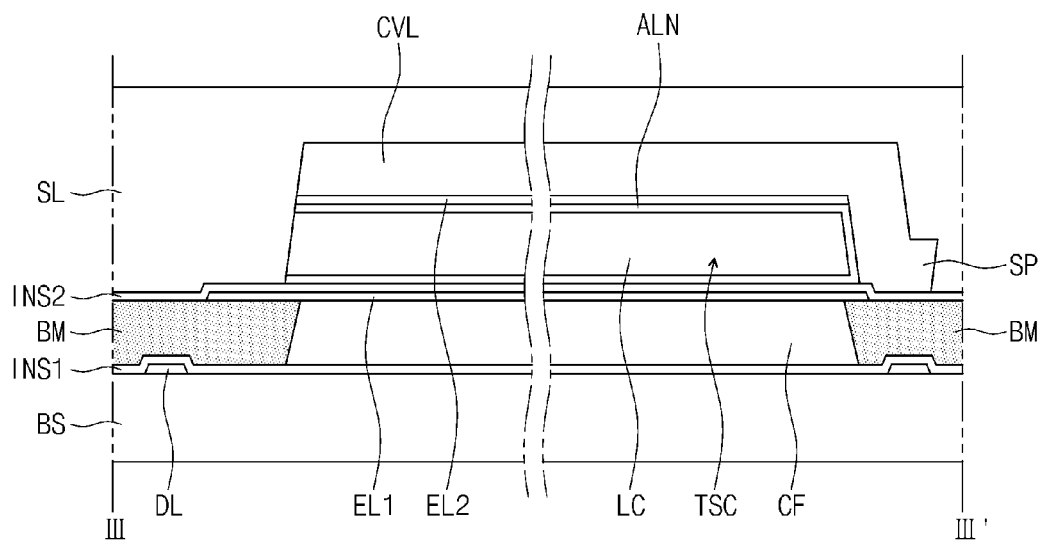

Referring to FIGS. 16A and 16B, the liquid crystal layer LC is formed in the tunnel-shaped cavity TSC (S190). Since the liquid crystal molecules are provided in a fluid form, the liquid crystal molecules move into the tunnel-shaped cavity TSC by a capillary tube phenomenon when the liquid crystal molecules are provided close to the tunnel-shaped cavity TSC, for example, at the entrance portions thereof. The liquid crystal molecules may be provided close to the tunnel-shaped cavity TSC using an inkjet device employing a micropipette. As a result, the liquid crystal layer LC is provided into the tunnel-shaped cavity TSC and between the tunnel-shaped cavities TSC adjacent to each other.

The liquid crystal layer LC may be provided into the tunnel-shaped cavity TSC by using a vacuum liquid crystal injection device. To this end, a portion of the base substrate BS on which the tunnel-shaped cavity TSC is formed is dipped into a vessel in a chamber in which a liquid crystal material is filled, and a pressure of the chamber is lowered. As a result, the liquid crystal material is provided into the tunnel-shaped cavity TSC by the capillary tube phenomenon Referring to FIGS. 17A and 17B, the liquid crystal layer LC is removed from the area except for the area in which the tunnel-shaped cavity TSC is formed, and the sealant layer SL is formed to surround the tunnel-shaped cavity TSC (S200). The sealant layer SL seals the opening portion of the tunnel-shaped cavity TSC, e.g., the entrance portions through which the liquid crystal molecules are injected by the capillary tub phenomenon.

The sealant layer SL is formed by a vacuum deposition method using the organic polymer, e.g., poly(p-xylene) polymer (i.e., parylene).

Figure 18A:
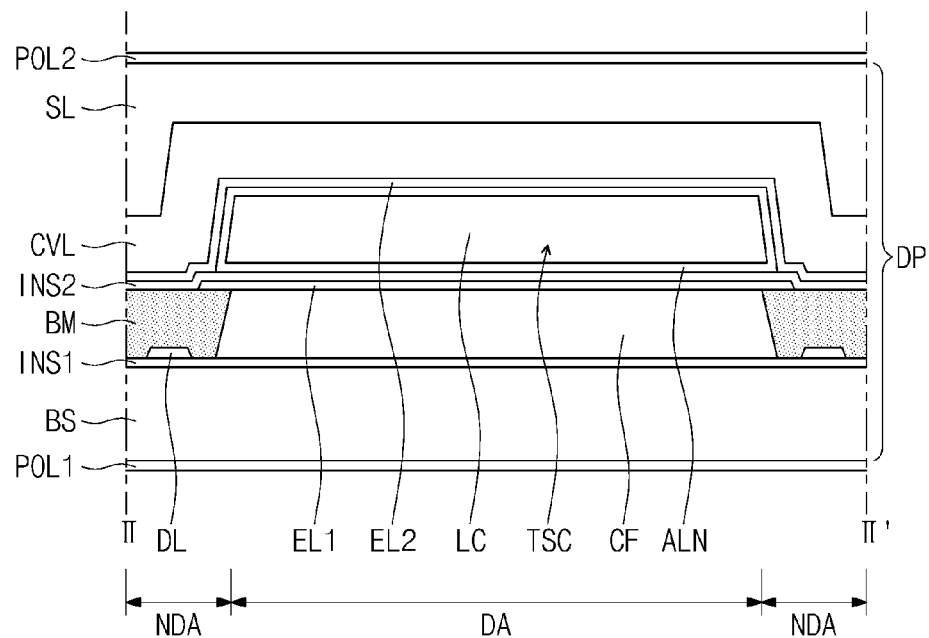
Figure 18B:
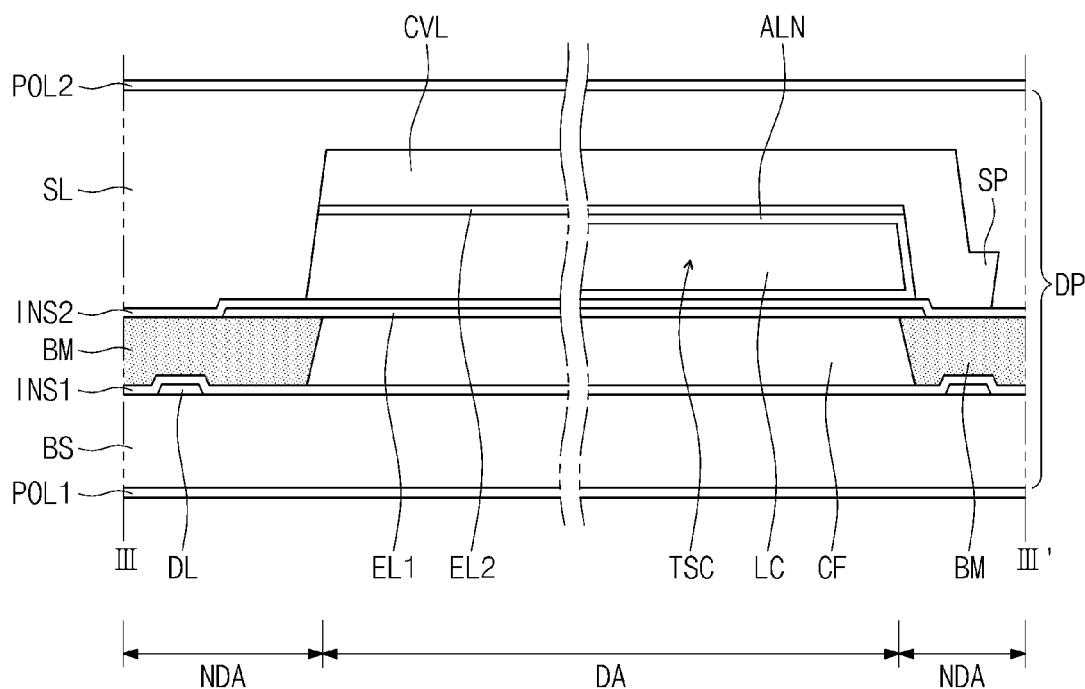

Referring to FIGS. 18A and 18B, the optical member is attached to the display panel DP manufactured by the above-mentioned method. The optical member includes the first and second polarizing plates POL1 and POL2.

As described above, a process of coupling two substrates in manufacturing a display device is omitted in one or more exemplary embodiment of the display device according to the invention. In addition, in one or more exemplary embodiment of a display device and manufacturing method thereof, the amount of substrates and the liquid crystal molecules is reduced compared to that of a conventional display device. Thus, a manufacturing time and a manufacturing cost of the display device are extremely reduced.

In one or more exemplary embodiment of a display device and manufacturing method thereof, the display device having the above-mentioned structure is not deformed even though a stress occurs when the display device is manufactured, and thus defects, which are caused by the deformation, may be reduced.

In detail, a cover layer may be easily deformed due to a residual stress of the material used to form the cover layer while the cover layer is formed. In particular, in the tunnel-shaped cavity, the cover layer is separated from the substrate when a sacrificial layer is removed. When a first portion of the cover layer which is separated from and parallel to the upper surface of the base substrate, and a second portion of the cover layer which connects the upper surface of the base substrate and the first portion, are referred to as a cover portion and a sidewall portion, respectively, the cover portion is easily deformed. In one exemplary embodiment, for instance, a distal end portion of the cover portion, which corresponds to the entrance portions, is upwardly lifted or downwardly sagged. When a distance between the second insulating layer and the cover layer is referred to as a cell gap, the cell gap is undesirably expanded or contracted when the distal end portion of the cover portion is upwardly lifted or downwardly sagged. Particularly, when the cover layer has the triple-layer cross-sectional structure of inorganic insulating layer/organic insulating layer/inorganic insulating layer, the deformation of the cover layer may be intensified due to the residual stress between the organic material and the inorganic material.

In addition, when the etchant used for the wet etch process to remove the sacrificial layer or the solvent of the alignment solution is removed, the distal end of the cover portion is downwardly sagged due to stiction caused by the surface tension of the fluid. When the distal end of the cover portion sags enough to make contact with the second insulating layer, the second insulating layer becomes undesirably attached to the second insulating layer by the Van der Waals force.

The surface tension of the fluid is represented by a function of the contact angle between the fluid and an inner surface of the tunnel-shaped cavity, e.g., the second electrode, and is applied to the whole area of the cover portion. When a beam bending theory is applied after the direction in which the cover portion is extended is assumed to be a length direction in a plan view and the direction vertical to the extension direction of the cover portion is assumed to be a width direction in the plan view, a maximum sag amount of the beam is represented by a function of four squares of the width. Therefore, as the width of the tunnel-shaped cavity is increased, i.e., as the width of the cover portion is increased, the sag amount of the cover portion is increased in proportional to the four squares. Moreover, the deformation intensively occurs at the entrance portions of the tunnel-shape cavity. This is because a force supporting the entrance portions is smaller than that of the center portion of the tunnel-shaped cavity when the fluid is evaporated in the area near the entrance portions.

According to the illustrated exemplary embodiment, since the support part is continuous with and connected to the cover portion corresponding to the entrance portions, the distal end of the cover portion is supported and a position thereof is maintained relative to the second insulating layer and a remaining portion of the cover layer. As described above, when the support part is positioned at the center position of the planar width, the planar width of the cover portion is reduced to approximately one-half (½) when compared to an initial planar width of the cover portion at the entrance portions, such that the maximum sag amount of the "beam" of the cover portion is reduced to about one-sixteenth (¹⁄₁₆). Thus, a variation of the cell gap is reduced, and the tunnel-shaped cavity has a uniform cell gap.

Figure 19A:
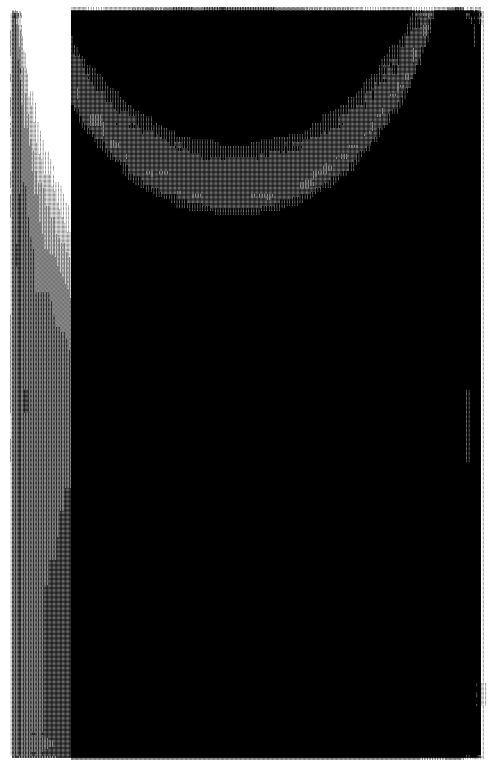
FIGS. 19A and 19B are photographs showing a cell gap difference of a tunnel-shaped cavity in a pixel having a support part and a pixel having no support part, according to the surface tension of a fluid.
Figure 19B:
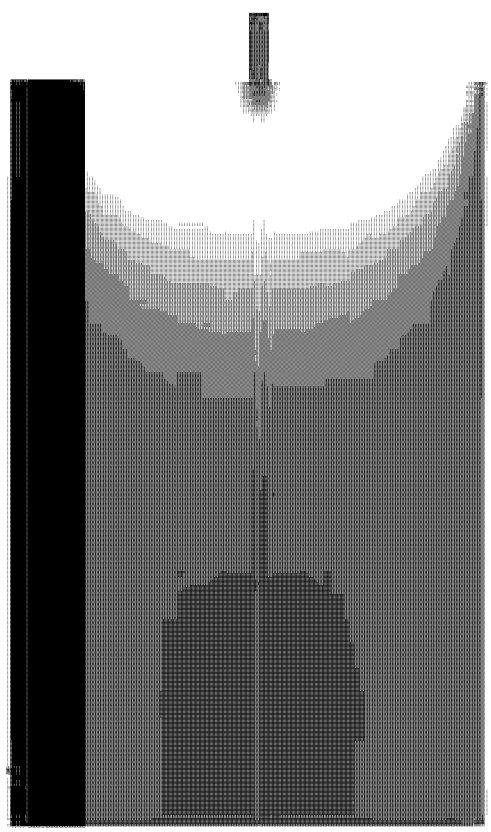

FIGS. 19A and 19B are photographs showing the cell gap difference of the tunnel-shaped cavity in a pixel having the support part and a pixel having no support part, according to the surface tension of the fluid.

Referring to FIGS. 19A and 19B, when the support part does not exist (FIG. 19A), the variation of the cell gap is relatively large at the entrance portions of the tunnel-shape cavity. When the support part exists (FIG. 19B), the variation of the cell gap is improved when compared to that of the cell gap when the support part does not exist. When assuming that the sagging degree of the cover portion in the entrance portions is 100 when the support part does not exist, the sagging degree of the cover portion in the entrance portions is about 33.11 when the support part exists. That is, the sagging degree of the cover portion is improved by about 69%.

Figure 20:
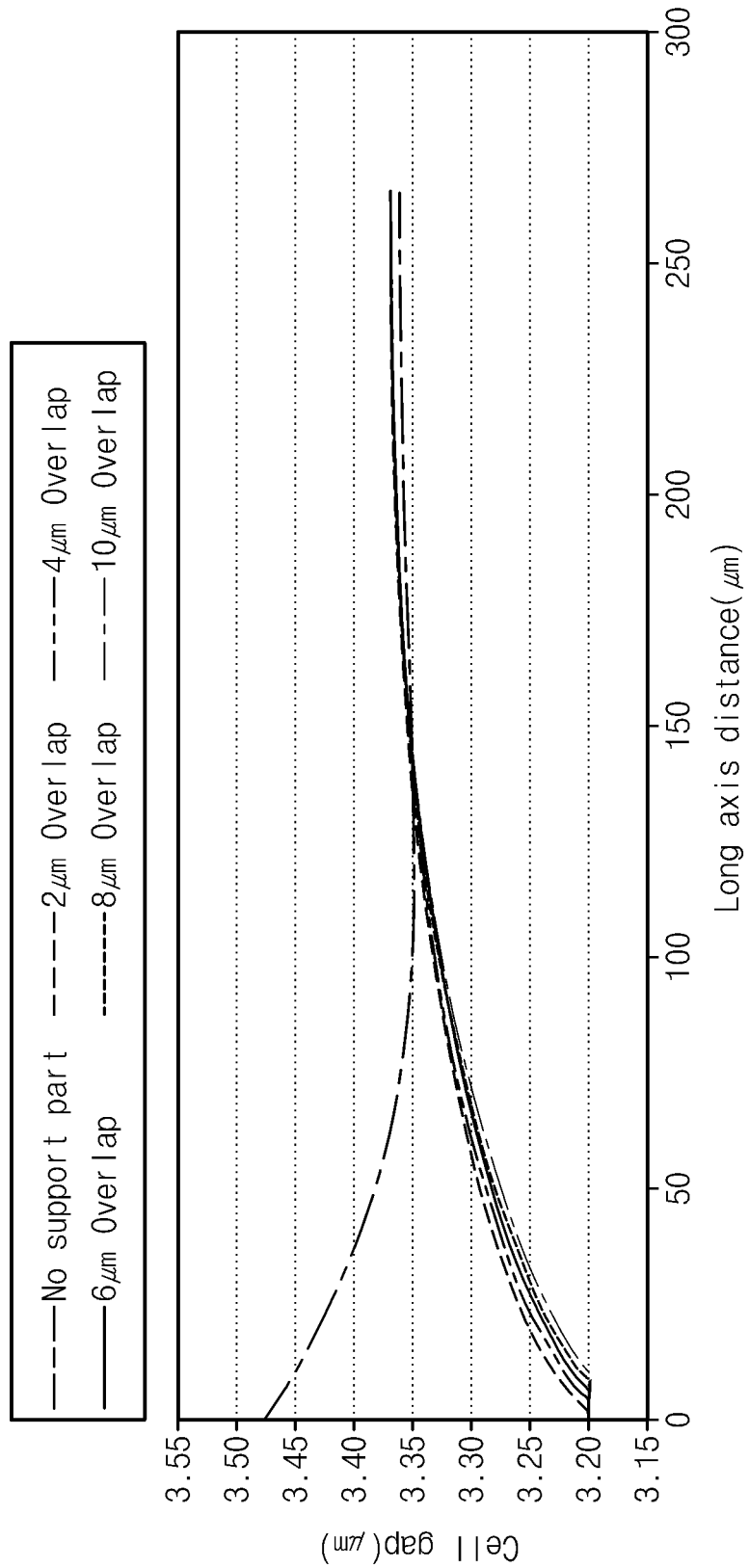
FIG. 20 is a graph showing a cell gap (micrometers: μm) of a tunnel-shaped cavity in the pixel having the support part and the pixel having no support part, with respect to a long axis distance (micrometers: μm) of the tunnel-shaped cavity, according to an applied stress from the fluid.

FIG. 20 is a graph showing the cell gap (micrometers: μm) of the tunnel-shaped cavity in the pixel having the support part and the pixel having no support part according to the stress of the fluid. The pixel with no support part is indicated by "No support part." An overlap amount represented by a numerical value in μm indicates an overlap degree between the support part and the display area. In addition, a long axis distance (micrometers: μm) indicates a distance according to the lengthwise extension (e.g., longitudinal) direction of the tunnel-shaped cavity when assuming that the entrance portions of the tunnel-shaped cavity is zero (0).

Referring to FIG. 20, when the stress, e.g., tensile stress, is applied to the entrance portion of the tunnel-shaped cavity, the cell gap at the entrance portion is about 3.47 micrometers where the support part does not exist, and the cell gap at the entrance portion is about 3.20 micrometers regardless of the overlap degree between the support part and the display area where the support part exists. This means that the stress is reduced by the support part even though the stress is applied to the entrance portion.

FIGS. 21A to 21E are plan views showing exemplary embodiment of support parts according to the invention.

Figure 21A:
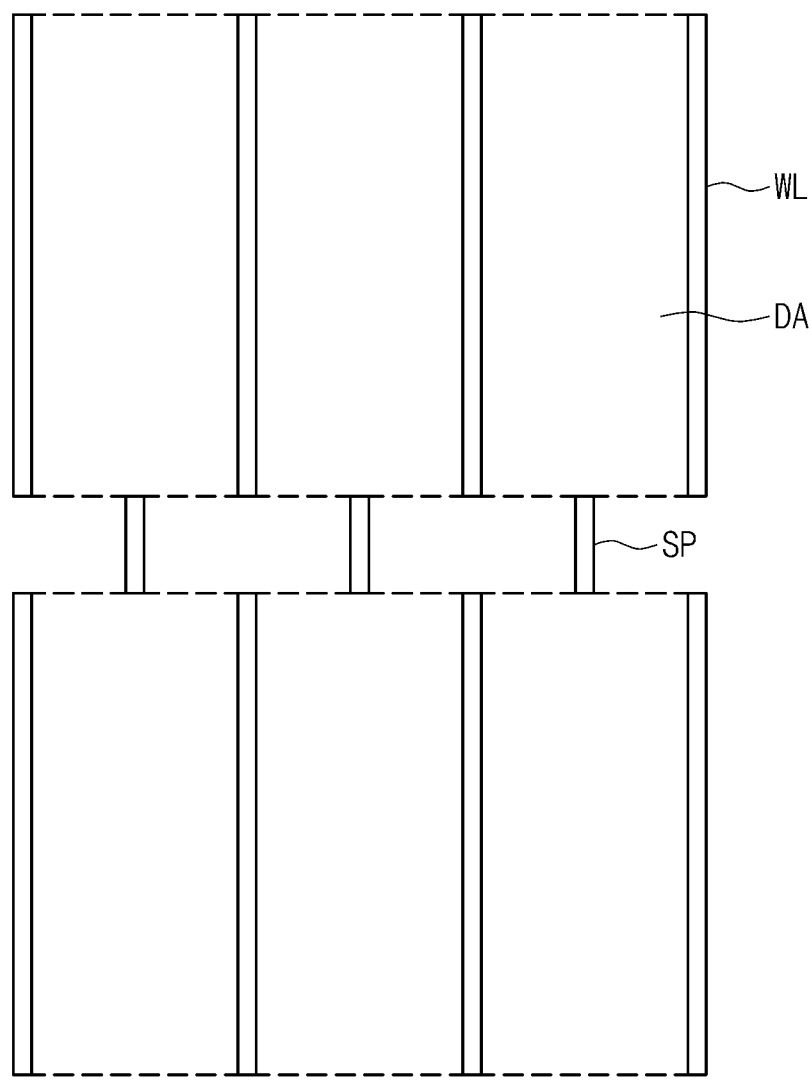
FIGS. 21A to 21E are views showing exemplary embodiments of support parts according to the invention.

Referring to FIG. 21A, the support part SP may be shared by adjacent tunnel-shaped cavities TSC, which is different from a support part SP independently provided at the entrance portion of each tunnel-shaped cavity TSC. The entrance portion and/or the boundary of the tunnel-shaped cavity TSC is indicated by the dotted lines. That is, the support part SP may be integrally formed as a single unitary and individual unit to correspond to the entrance portions of the adjacent tunnel-shaped cavities TSC.

Figure 21B:
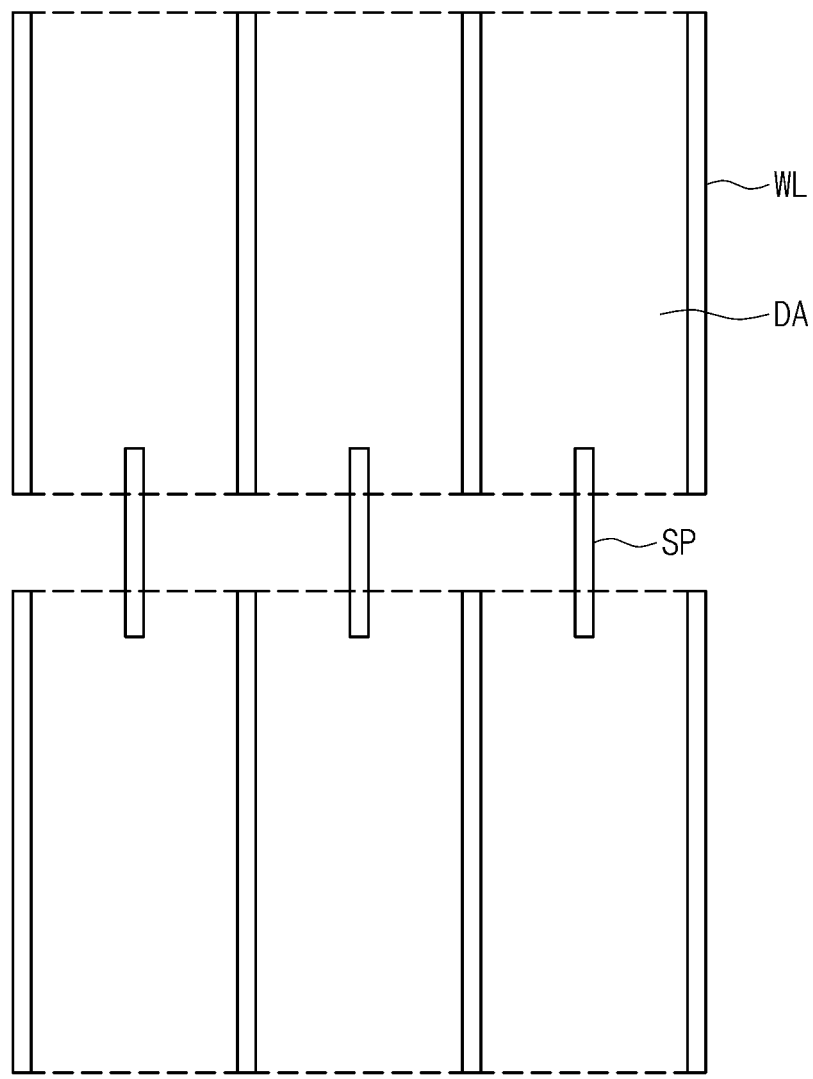

Referring to FIG. 21B, the single, unitary support part SP may be extended into the tunnel-shaped cavity TSC to be overlapped with the display area DA.

Figure 21C:
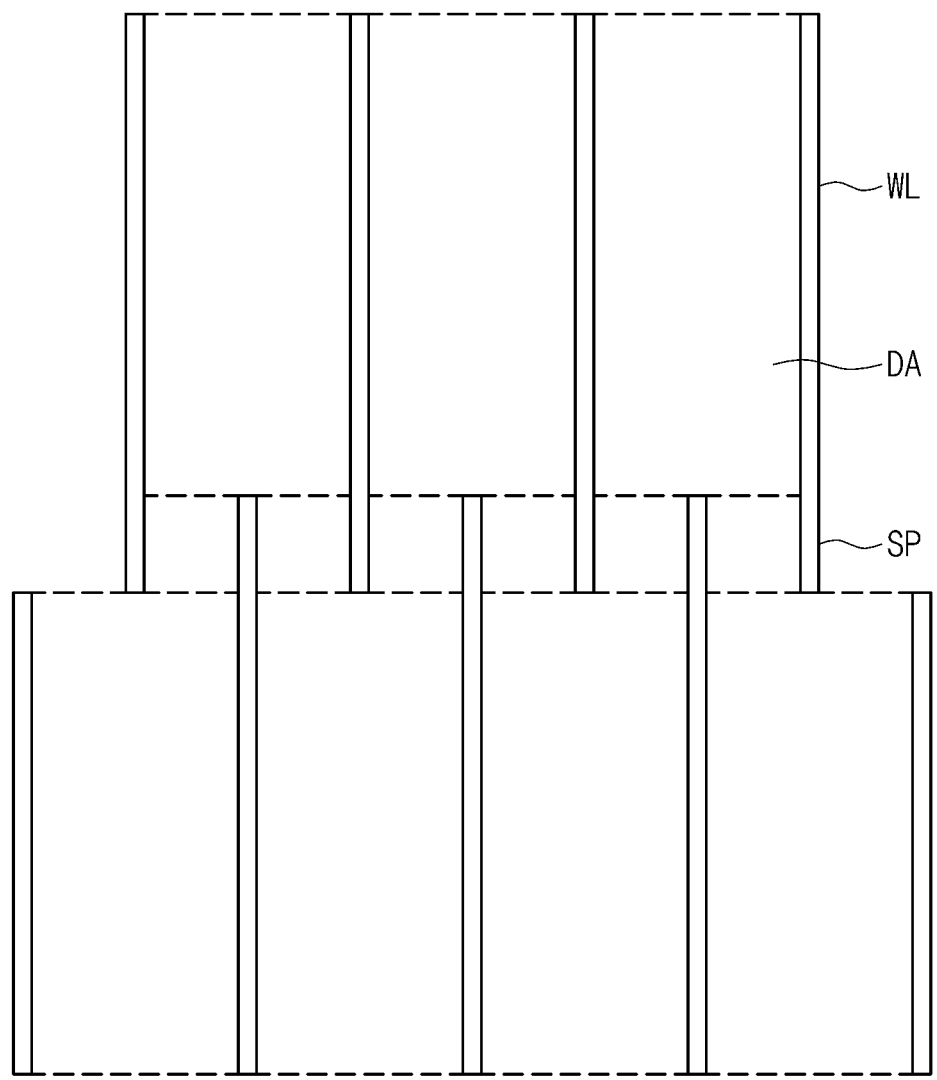

Referring to FIG. 21C, the single, unitary support part SP may be continuous with and extended from the sidewall portion WL adjacent thereto.

Figure 21D:
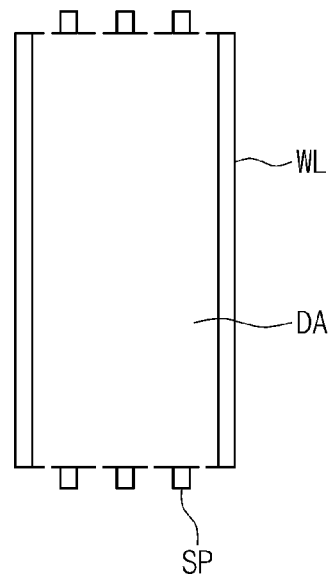

Referring to FIG. 21D, the support part SP may be include a plurality of discrete portions each at the entrance portion of each tunnel-shaped cavity TSC. While the reference numeral SP is indicated for only one of the discrete portions in FIG. 21D, a group of the discrete portions may be labeled as one collective SP.

Figure 21E:
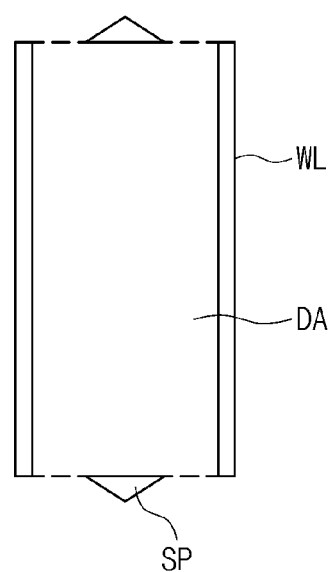

Referring to FIG. 21E, the support part SP may have various shapes in the plan view, e.g., a triangular shape, but should not be limited thereto or thereby.

Figure 22:
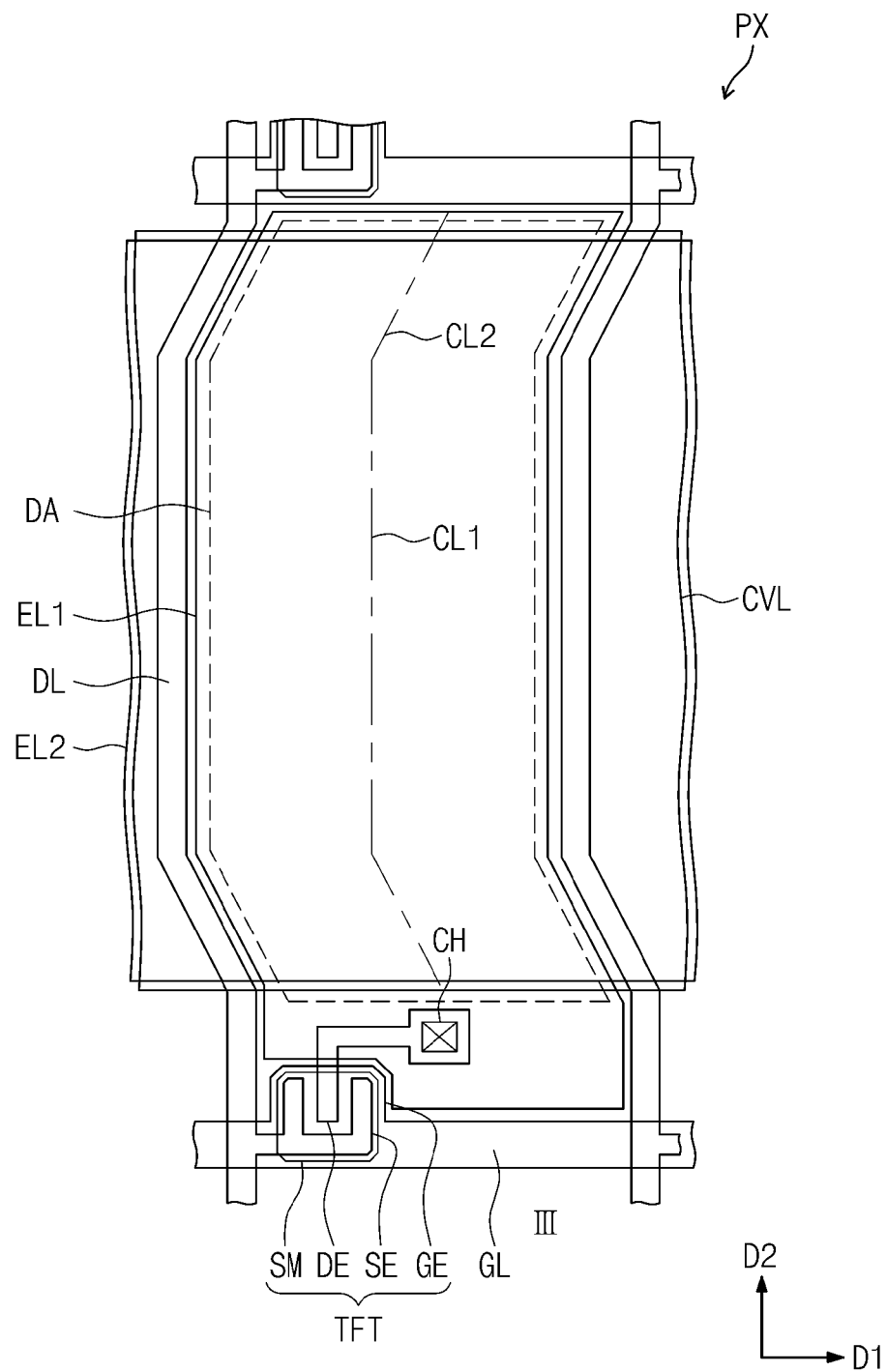
FIG. 22 is a plan view showing another exemplary embodiment of a display device according to the invention.

FIG. 22 is a plan view showing another exemplary embodiment of a display device according to the invention.

Referring to FIG. 22, since the tunnel-shaped cavity TSC has the shape substantially corresponding with the shape of the display area DA when viewed in a plan view, the shape of the tunnel-shaped cavity TSC will be mainly described. That is, the display area DA corresponding to the tunnel-shaped cavity TSC may have a substantially rectangular shape when viewed in a plan view, but the display area DA may have a shape other than a rectangle.

In other words, when a virtual line passes through a center portion of the planar width of the tunnel-shaped cavity TSC, the width taken perpendicular to the lengthwise extension (e.g., longitudinal) direction of the tunnel-shaped cavity TSC, along the longitudinal direction of the tunnel-shaped cavity TSC is referred to as a center line, the center line may be a sum of two or more straight lines, a curved line, or a sum of curved and straight lines. In FIG. 22, the center line includes a first center line CL1 extended parallel to the second direction D2 and second center lines CL2 connected to each of opposing ends of the first center line CL1 and inclined with respect to the second direction D2. Edges or boundaries of the display area DA are respectively parallel to the first and second center lines CL1 and CL2 of the tunnel-shaped cavity TSC.

In one or more exemplary embodiment of the display device having the above-mentioned structure, upward lifting or downward sagging of the cover layer at the entrance portion may be reduced or effectively prevented. The lifting or sagging of the cover portion is caused by the residual stress or the surface tension. However, since the cover portion is bent several times in the longitudinal direction shown in the illustrated exemplary embodiment, the force caused by the residual stress and the surface tension is distributed and scattered even though the force is applied to the cover portion. That is, although the residual stress and the surface tension are applied to the cover portion at the entrance portion of the tunnel-shaped cavity, the force applied at the entrance portion is reduced since the cover portion of the cover layer extends along the length of the tunnel-shaped cavity as indicated by the center line being bent one or more times.

Figure 23:
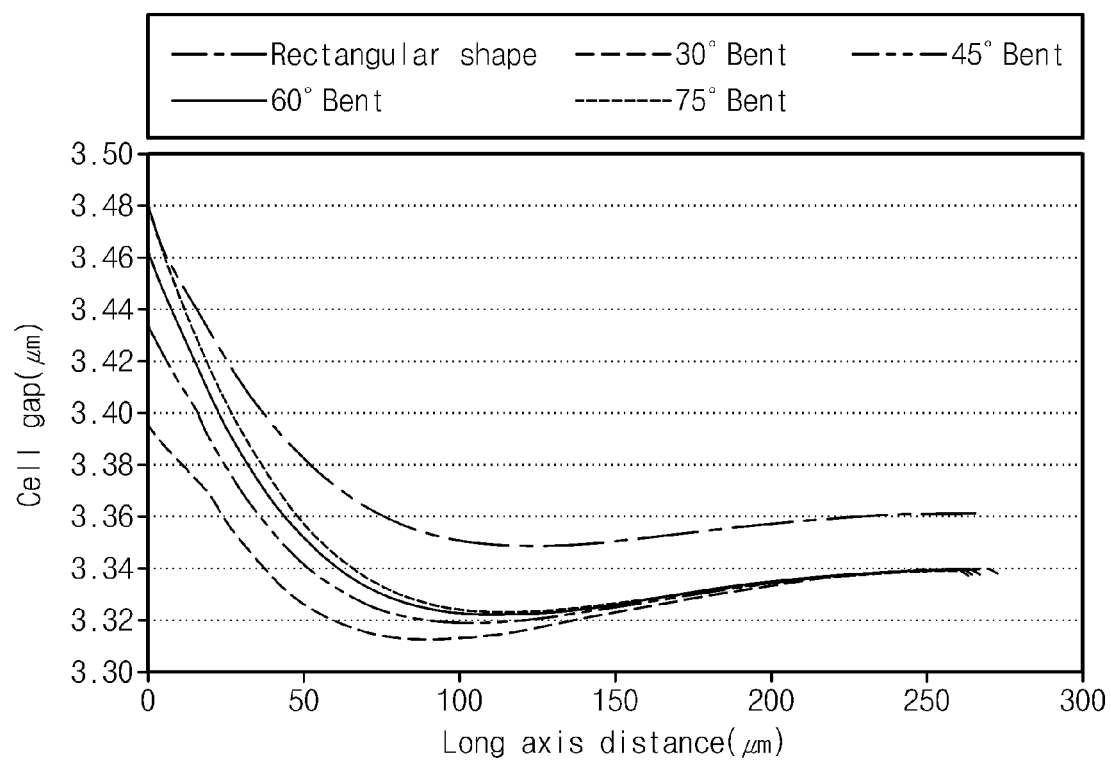
FIG. 23 is a graph showing a cell gap (μm) of a bending angle of a center line in a pixel.

The following Table 1 shows the cell gap (micrometers: μm) in accordance with a bending angle of the center line in the pixel PX shown in FIG. 22, and FIG. 23 is a graph showing the cell gap of the bending angle (degrees: °) of the center line in the pixel PX. The bending position is spaced apart from the entrance portion of the tunnel-shaped cavity TSC by about 10 micrometers, the bending angle is set with respect to the width direction of the tunnel-shaped cavity TSC, i.e., the first direction D1, and the "Rectangular shape" line represents a reference pixel in which the center line is not curved.

TABLE 1

|  | Maximum cell gap (μm) | Minimum cell gap (μm) | Cell gap difference (μm) |
| --- | --- | --- | --- |
| Rectangular shape | 3.477 | 3.348 | 0.129 |
| 30 degrees bent | 3.395 | 3.313 | 0.083 |
| 45 degrees bent | 3.434 | 3.319 | 0.115 |
| 60 degrees bent | 3.463 | 3.322 | 0.141 |
| 75 degrees bent | 3.481 | 3.323 | 0.157 |

Referring to Table 1 and FIG. 23, as the bending angle becomes larger, the lifting of the cover portion of the cover layer at the entrance portion is reduced. For instance, the cell gap difference is about 0.129 μm where the pixel has the rectangular shape, but the cell gap difference is about 0.083 μm where the center line is bent about 30 degrees. That is, the cell gap difference is improved about 36%.

Figure 24:
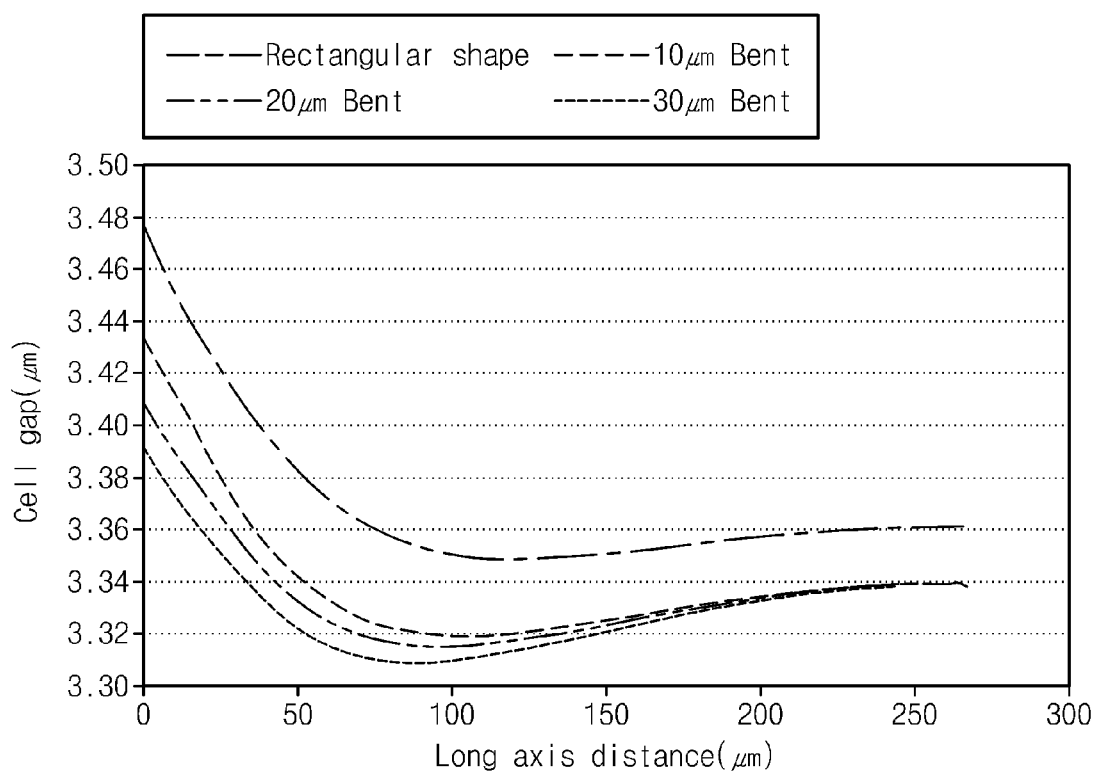
FIG. 24 is a graph showing a cell gap (μm) of a bending position of the center line in the pixel.

The following Table 2 shows the cell gap (micrometers: μm) in accordance with the bending position of the center line taken from the entrance portion of the tunnel-shaped cavity TSC in the pixel PX shown in FIG. 22, and FIG. 24 is a graph showing the cell gap of the bending position of the center line in the pixel. The bending angle of the center line in the pixel PX is set to about 45 degrees.

TABLE 2

|  | Maximum cell gap (μm) | Minimum cell gap (μm) | Cell gap difference (μm) |
| --- | --- | --- | --- |
| Rectangular shape | 3.477 | 3.348 | 0.129 |
| 10 micrometers | 3.434 | 3.319 | 0.115 |
| 20 micrometers | 3.410 | 3.315 | 0.094 |
| 30 micrometers | 3.393 | 3.309 | 0.084 |

Referring to Table 2 and FIG. 24, as the bending position becomes further away from the entrance portion, the lifting of the cover portion of the cover layer at the entrance portion is reduced. For instance, the cell gap difference is about 0.129 μm where the pixel has the rectangular shape, but the cell gap difference is about 0.084 μm where the center line bent at the position spaced apart from the entrance portion by about 30 micrometers. That is, the cell gap difference is improved about 35%.

FIGS. 25A to 25D are views showing exemplary embodiments of planar shapes of display areas with respect to center lines of a tunnel-shaped cavity TSC.

Figure 25A:
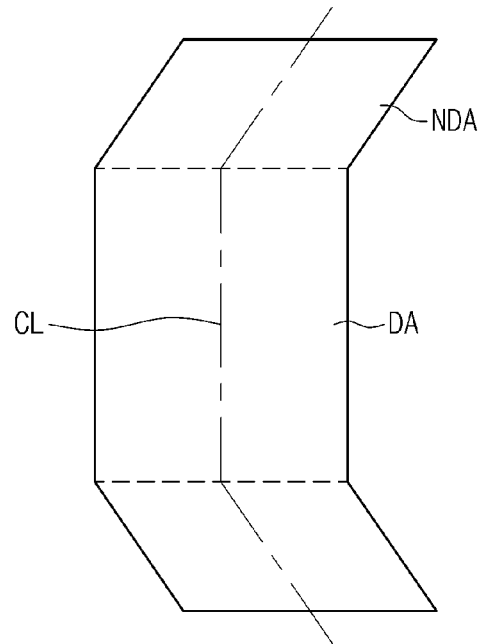
FIGS. 25A to 25D are views showing exemplary embodiments of shapes of display areas with respect to center lines.
Figure 25B:
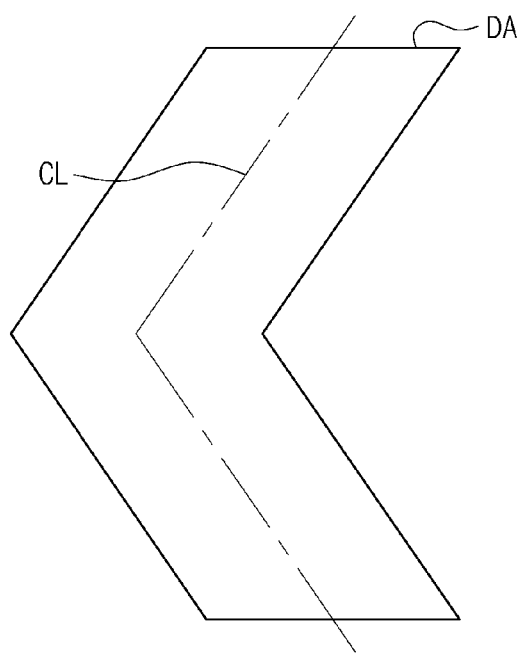
Figure 25C:
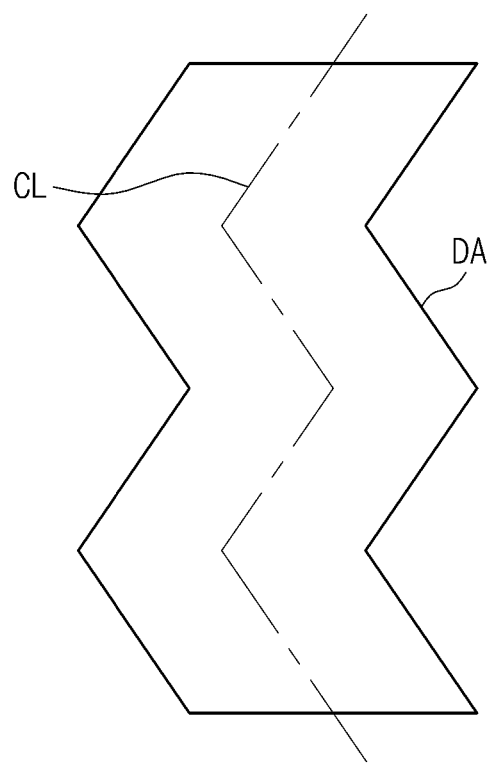
Figure 25D:
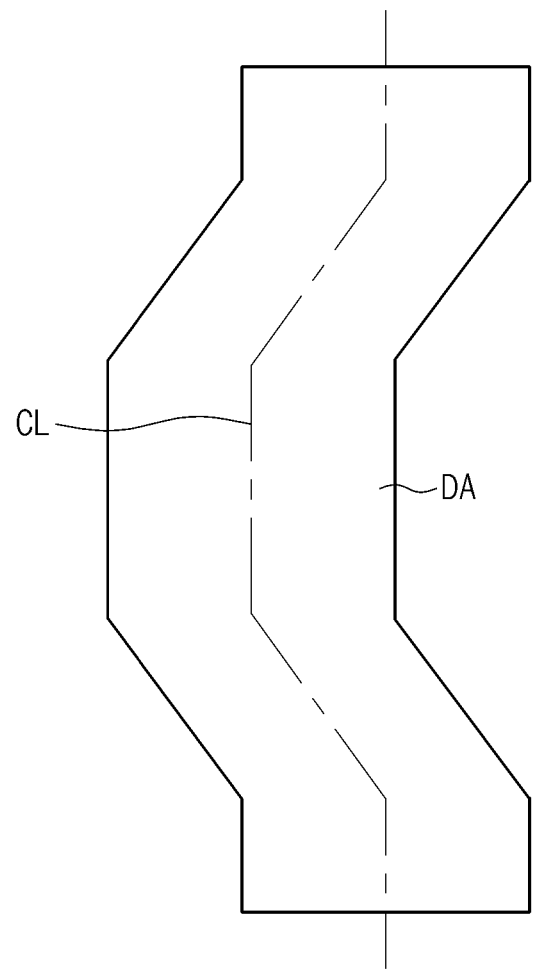

Within each display area DA, the center lines CL may have one or more straight lines extended in different directions from each other. As shown in FIGS. 25B, 25C and 25D, the center lines CL overlap the display area DA, and the display area DA may include the liquid crystal layer LC. According to FIG. 25A, however, the tunnel-shaped cavity TSC is provided to correspond to both the display area DA and the non-display area NDA, the bent portion is provided to correspond to the non-display area NDA, and the non-display area NDA may not include the liquid crystal layer LC.

Figure 26:
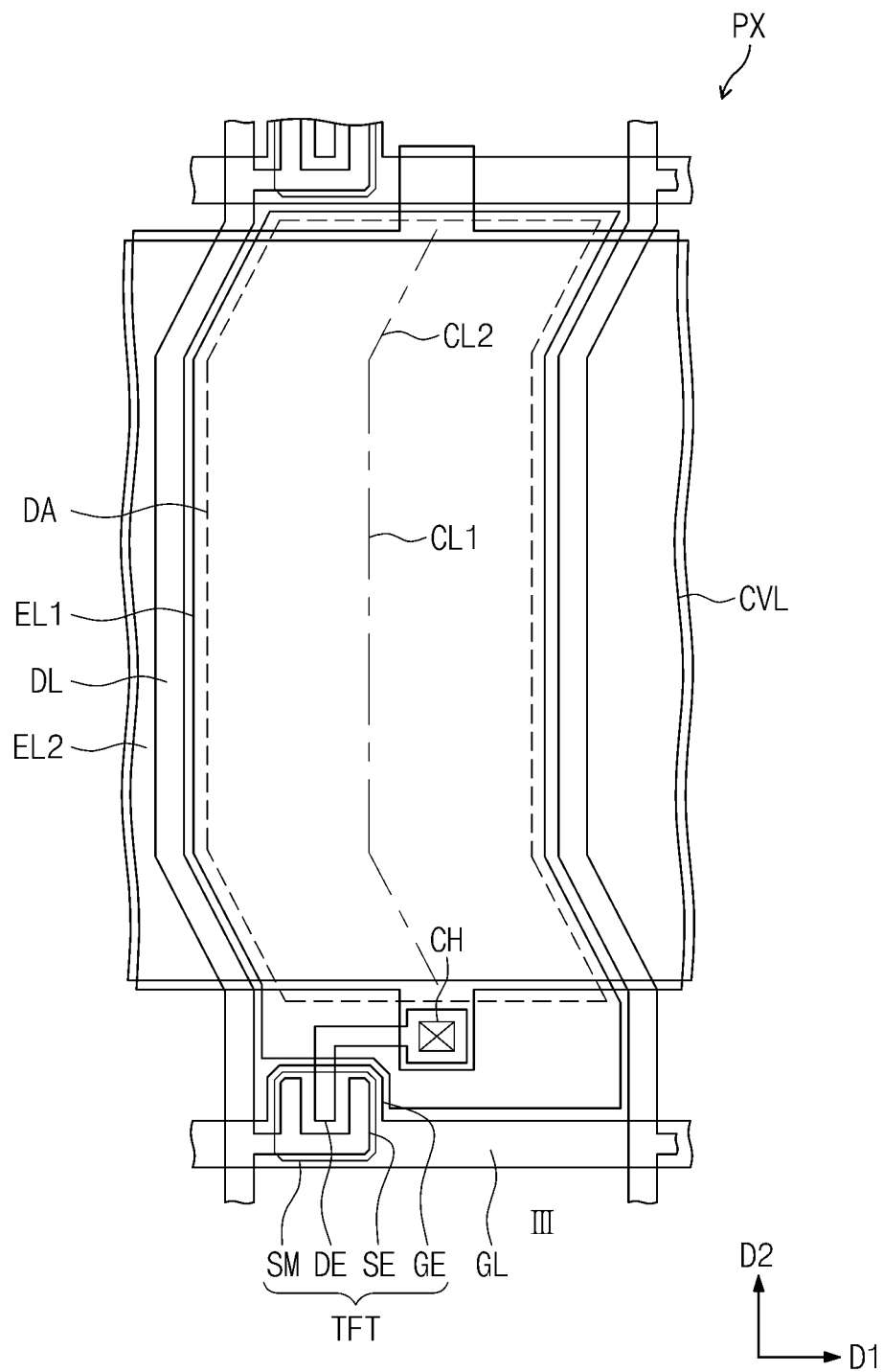
FIG. 26 is a plan view showing still another exemplary embodiment of a display device according to the invention.

FIG. 26 is a plan view showing still another exemplary embodiment of a display device according to the invention. As shown in FIG. 26, the previously above-described exemplary embodiments may be combined in whole or in part in order to reduce the lifting or sagging of the cover portion of the cover layer at the entrance portion of the tunnel-shaped cavity. That is, the display device according to the illustrated exemplary embodiment may include the support part of the cover layer and the center line of the tunnel-shaped cavity may be bent.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A liquid crystal display device comprising:
a substrate;
a cover layer which defines a tunnel-shaped cavity on the substrate, the tunnel-shaped cavity comprising an entrance portion disposed at an edge of the tunnel- shaped cavity, wherein the entrance portion exposes an inner area of the tunnel-shaped cavity defined by the cover layer;

a support part extended from the cover layer at the edge of the tunnel-shaped cavity at which the entrance portion is disposed, wherein the support part divides the entrance portion of the tunnel-shaped cavity defined by the cover layer into plural portions;

a liquid crystal layer in the tunnel-shaped cavity;

first and second electrodes which apply an electric field to the liquid crystal layer;

a sealant layer which seals the tunnel-shaped cavity;

a color filter; and a black matrix disposed at opposing ends of the color filter, wherein the first electrode is disposed between the substrate and the tunnel-shaped cavity, and the color filter and the black matrix which is disposed at the opposing ends of the color filter are each disposed between the substrate and the first electrode.

2. The liquid crystal display device of claim 1, wherein the tunnel-shaped cavity comprises the entrance portion at both of opposing ends thereof, wherein the entrance portions each expose the inner area of the tunnel-shaped cavity, and the support part corresponds to each of the entrance portions.

3. The liquid crystal display device of claim 2, wherein the support part comprises a plurality of portions each corresponding to the edge of the tunnel-shaped cavity at which the entrance portion is disposed.

4. The liquid crystal display device of claim 2, wherein the support part overlaps with the tunnel-shaped cavity when viewed in a plan view.

5. The liquid crystal display device of claim 2, wherein the support part comprises a same material as the cover layer.

6. The liquid crystal display device of claim 2, wherein the cover layer and the support part form a single, unitary member.

7. The liquid crystal display device of claim 2, wherein the support part is between the substrate and the cover layer, and has a column shape in a plan view.

8. The liquid crystal display device of claim 2, wherein the cover layer comprises:

a cover portion separated from the substrate and substantially parallel to an upper surface of the substrate; and a sidewall portion which connects the upper surface of the substrate and the cover portion, and the support part is extended from the sidewall portion.

9. The liquid crystal display device of claim 2, wherein the support part has a polygonal shape when viewed in a plan view.

10. The liquid crystal display device of claim 2, further comprising:

a plurality of tunnel-shaped cavities, and the support part is a single, unitary member which corresponds to respective edges of adjacent tunnel-shaped cavities at which the entrance portions thereof are disposed.

11. The liquid crystal display device of claim 2, wherein the tunnel-shaped cavity has a rectangular shape when viewed in a plan view, a length, and a width perpendicular to the length, and a center line which extends along a lengthwise direction of the tunnel-shaped cavity and passes through a center portion of a width direction comprises a bent portion.

12. The liquid crystal display device of claim 11, wherein the center line comprises two straight lines inclined with respect to each other.

13. The liquid crystal display device of claim 12, wherein the substrate comprises:

a gate line extended in a first direction;

a data line extended in a second direction substantially perpendicular to the first direction; and a thin film transistor connected to the gate line and the data line, and the center line comprises:

a first center line extended in the second direction, and second center lines respectively connected to opposing ends of the first center line and inclined with respect to the second direction.

14. The liquid crystal display device of claim 13, wherein the first center line overlaps the liquid crystal layer when viewed in the plan view, and the second center lines are not overlapped with the liquid crystal layer when viewed in the plan view.

15. The liquid crystal display device of claim 11, wherein the center line is a curved line.

16. A liquid crystal display device comprises:

a substrate;

a cover layer which defines a tunnel-shaped cavity on the substrate;

a liquid crystal layer in the tunnel-shaped cavity;

first and second electrodes which apply an electric field to the liquid crystal layer;

a sealant layer which seals the tunnel-shaped cavity;

a color filter; and a black matrix disposed at opposing ends of the color filter, wherein the first electrode is disposed between the substrate and the tunnel-shaped cavity, the color filter and the black matrix which is disposed at the opposing ends of the color filter are each disposed between the substrate and the first electrode, and a center line which extends along a lengthwise direction of the tunnel-shaped cavity and passes through a center portion of a width direction vertical to the lengthwise direction of the tunnel-shaped cavity, comprises a bent portion.

17. The liquid crystal display device of claim 16, wherein the center line comprises two straight lines inclined with respect to each other.

18. The liquid crystal display device of claim 17, wherein the substrate comprises:

a gate line extended in a first direction;

a data line extended in a second direction substantially perpendicular to the first direction; and a thin film transistor connected to the gate line and the data line, and the center line comprises:

a first center line extended in the second direction, and second center lines respectively connected to opposing ends of the first center line and inclined with respect to the second direction.

19. The liquid crystal display device of claim 18, wherein the first center line overlaps the liquid crystal layer when viewed in a plan view, and the second center lines are not overlapped with the liquid crystal layer when viewed in the plan view.

20. The liquid crystal display device of claim 16, wherein the center line is a curved line.

* * * * *